United States Patent
Sugihara et al.

(10) Patent No.: US 8,273,167 B2
(45) Date of Patent: Sep. 25, 2012

(54) PIGMENT DISPERSION COMPOSITION, CURABLE COLOR COMPOSITION, COLOR FILTER AND METHOD FOR PRODUCING THE SAME

(75) Inventors: Koichi Sugihara, Shizuoka (JP); Kazuhiro Fujimaki, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 169 days.

(21) Appl. No.: 12/740,117

(22) PCT Filed: Oct. 24, 2008

(86) PCT No.: PCT/JP2008/069331
§ 371 (c)(1),
(2), (4) Date: Apr. 28, 2010

(87) PCT Pub. No.: WO2009/057523
PCT Pub. Date: May 7, 2009

(65) Prior Publication Data
US 2010/0256252 A1   Oct. 7, 2010

(30) Foreign Application Priority Data
Nov. 1, 2007   (JP) ................................. 2007-285489

(51) Int. Cl.
C09D 11/10   (2006.01)
C09D 11/02   (2006.01)
C09D 11/00   (2006.01)
C08J 3/28    (2006.01)
C08F 2/50    (2006.01)

(52) U.S. Cl. .............. 106/31.47; 106/31.13; 106/31.43; 106/31.46; 106/31.6; 106/31.85; 106/31.87; 106/31.75; 106/31.76; 106/31.77; 524/89; 524/90; 524/100; 522/71; 522/74; 522/75; 522/78; 522/79; 522/81; 522/113; 522/114; 522/150; 522/121; 522/153; 522/157; 522/178; 522/182; 522/909; 427/487; 427/553; 427/555; 427/558; 427/508; 427/510; 427/511; 427/514

(58) Field of Classification Search .............. 106/31.13, 106/31.6, 31.85, 31.87, 31.01, 31.75, 31.76, 106/31.77; 524/88, 90, 100; 522/71, 74, 522/75, 78, 79, 81, 113, 114, 120, 121, 150, 522/153, 157, 178, 182, 909; 427/487, 553, 427/555, 558, 508, 510, 511, 514
See application file for complete search history.

(56) References Cited

U.S. PATENT DOCUMENTS
2007/0179213 A1   8/2007   Shakhnovich et al.

FOREIGN PATENT DOCUMENTS

| EP | 0243304 A2 | 10/1987 |
|---|---|---|
| EP | 0870809 A2 | 10/1998 |
| JP | 6065521 A | 3/1994 |
| JP | 7-013016 A | 1/1995 |
| JP | 7041689 A | 2/1995 |
| JP | 8-179111 A | 7/1996 |
| JP | 2003-026950 A | 1/2003 |
| JP | 2007-186681 A | 7/2007 |
| JP | 2008-231336 A | 10/2008 |
| JP | 2008-231337 A | 10/2008 |
| JP | 2008-231340 A | 10/2008 |
| JP | 2009179789 A * | 8/2009 |

OTHER PUBLICATIONS

Schroeder J: "Surface treatment of pigments" Progress in Organic Coatings, Elsevier BV, NL, vol. 16, No. 1, May 17, 1988 pp. 3-17, XP009112474, ISSN:0300-9440, DOI:10.1016/0033-0655(88)80003-7.
Corresponding The extended European search report issued on Apr. 26, 2011.

* cited by examiner

Primary Examiner — Sanza McClendon
(74) Attorney, Agent, or Firm — SOLARIS Intellectual Property Group, PLLC

(57) ABSTRACT

The present invention provides: a pigment dispersion composition including (A) an organic pigment, (B) a pigment derivative represented by Formula (I) below and (C) a polymer compound having a pigment-adsorptive functional group; a curable color composition including the pigment dispersion composition, a polymerizable compound and a polymerization initiator; and a color filter having a color region formed using the curable color composition and a method for producing the same. Q represents an organic colorant residue; A represents an ethylene group or the like; and R represents a hydroxyl group or a group represented by —NH-A-Z; Z represents —SO$_3$H, —COOH or a salt thereof; and n represents an integer of from 1 to 4. When R represents —NH-A-Z, the structures represented by the two —NH-A-Zs bonded to the triazine ring contained in each of the n partial structures bonded to Q may be the same as each other or different from each other.

Formula (I)

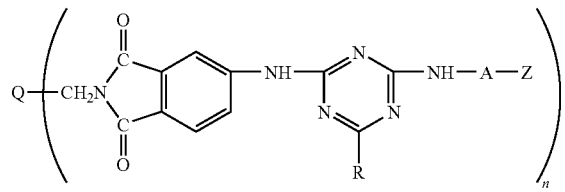

8 Claims, No Drawings

PIGMENT DISPERSION COMPOSITION, CURABLE COLOR COMPOSITION, COLOR FILTER AND METHOD FOR PRODUCING THE SAME

TECHNICAL FIELD

The present invention relates to a pigment dispersion composition containing a pigment as a colorant dispersed therein, a curable color composition using the same, a color filter and a method for producing the same.

BACKGROUND ART

Color filters are produced by forming a color pattern by photolithography or the like using a curable color composition containing a pigment dispersion composition in which an organic pigment or an inorganic pigment is dispersed, a multifunctional monomer, a photopolymerization initiator, an alkali-soluble resin, and other components.

In recent years, there has been a trend for the liquid crystal display (LCD) applications of color filters to be expanded to television (TV) applications as well as monitor applications. With this trend toward expanded applications, high levels of color properties are required with respect to chromaticity, contrast and the like. Further, in image sensor (solid-state imaging device) applications, color filters are similarly required to have high levels of color properties, such as a reduction in color unevenness and improvement of chromatic resolving power.

With regard to the above requirements, it is required that the pigment contained in a curable color composition be dispersed in a finer state (favorable dispersibility) and be dispersed in a stable state (favorable dispersion stability). In particular, making the primary particle diameter of the pigment very small is effective.

An example of a method for making the primary particle diameter of the pigment very small is a method of mechanically kneading the pigment, together with a synthetic resin that is solid and water-insoluble at room temperature, a water-soluble inorganic salt such as common salt and a water-soluble organic solvent that dissolves at least a part of the synthetic resin, using a kneader or the like (kneading of a mixture containing a pigment, a water-soluble inorganic salt and a water-soluble organic solvent is hereinafter referred to as "salt milling"), and thereafter removing the inorganic salt and the organic solvent by washing with water (see, for example, Patent Document 1). In this method, since pulverization of primary particles of the pigment and crystal growth occur in parallel during the process, a pigment having a narrow particle size distribution and having a surface area that is small even for its small average particle diameter is ultimately obtained; therefore, this method is a method of producing a pigment that is useful for applications, such as color filters, in which a pigment having a very small particle size has to be dispersed at high concentrations.

However, when the primary particles of the pigment are made finer, the particles are more likely to aggregate, and are more likely to form an aggregate (secondary aggregate) when in a state of slurry or when dried. Further, as the primary particles of the pigment are made finer, strong secondary aggregation is more likely to occur. Therefore, it is generally very difficult to re-disperse the finer pigment as primary particles.

When the dispersibility of the pigment is insufficient and aggregates and the like are present, a color film formed using a curable color composition containing the pigment has poor uniformity, and fringes (indents at an edge portion) and surface irregularity occur at the curable color film, as a result of which conditions such as generation of color density unevenness, a reduction in dimensional accuracy, and significant deterioration of contrast may arise in a produced color filter.

When the dispersion stability of the pigment is insufficient, there is a problem in that constituent components of the curable color composition, including the pigment, aggregate and cause an increase in viscosity over time, as a result of which the pot life becomes extremely short. When producing a color filter using such a curable color composition, the uniformity of the film thickness in the coating process is reduced, which is likely to cause problems such as sensitivity variations in the exposure process, alkali-solubility variations in the development process and non-uniformity. In particular, if slit coating (or die coating) is performed when forming a color film formed from a curable color composition on a glass substrate in order to produce a color filter with a large surface area, there has been a problem in that defects such as streaks easily occur on the coating surface, and the properties of the coating surface decline, which leads to pixel defects in the color filter.

In order to improve the dispersion stability of a pigment obtained by applying the salt milling method, a method in which a rosin or rosin derivative, or a synthetic polymer, is added at the time of salt milling has been proposed (see, for example, Patent Document 2). A method in which the dispersion stability is improved by additionally using a specific pigment derivative or a dispersant containing a partial skeleton of an organic pigment in the dispersing process has been proposed as another measure to improve the dispersion stability (see, for example, Patent Documents 3 and 4).

Patent Document 1: Japanese Patent Application Laid-Open (JP-A) No. 7-13016
Patent Document 2: JP-A No. 8-179111
Patent Document 3: JP-A No. 2007-186681
Patent Document 4: JP-A No. 2003-26950

DISCLOSURE OF THE INVENTION

Problem to be Solved by the Invention

The above-described techniques provide a certain degree of improvement effects when concentrating on only the acquisition of finer pigment particles and the contrast of an image. However, a problematic point has been found in that defects such as streaks easily occur on the coating surface during the coating process of a color film for forming a color filter, especially when performing slit coating (which may be also referred to as die coating) on a glass substrate, and that the defects lead to pixel defects in the color filter.

The present invention has been made in view of the foregoing, and provides a pigment dispersion composition having high pigment dispersibility and having high dispersion stability after dispersing, and a curable color composition which contains the pigment dispersion composition, which has excellent coating properties, and which is capable of forming a uniform coating film suitable for producing a color filter. The invention further provides a color filter which can be obtained using the curable color composition, which is capable of obtaining high contrast, and which has a color region having reduced color unevenness and, in particular, a color filter which has reduced color unevenness and excellent color separation and which is suitable for solid-state imaging device applications, and a method for producing the same.

Means for Solving the Problem

As a result of study, the present inventors have found that the dispersibility and dispersion stability of a pigment are improved by using a pigment derivative having a specific structure and a dispersant.

Specific measures for achieving the above objects are as follows.

<1> A pigment dispersion composition including (A) an organic pigment, (B) a pigment derivative represented by Formula (I) and (C) a polymer compound having a pigment-adsorptive functional group:

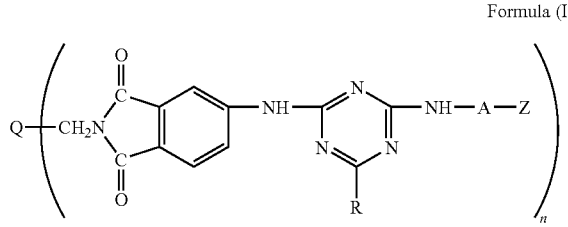

Formula (I)

wherein, in Formula (I), Q represents an organic colorant residue having an aromatic ring; A represents an ethylene group, a phenylene group or a naphthylene group; and R represents a hydroxyl group or a group represented by —NH-A-Z; Z represents a substituent selected from —SO$_3$H, —COOH or a metal salt, ammonium salt or amine salt thereof; and n represents an integer of from 1 to 4. When R represents —NH-A-Z, in the two —NH-A-Zs bonded to the triazine ring contained in each of the n partial structures (the structure in parentheses) bonded to Q in Formula (I), the groups represented by the two As may be the same as each other or different from each other, and the substituents represented by the two Zs may be the same as each other or different from each other, that is, the structures represented by the two —NH-A-Zs may be the same as each other or different from each other.

<2> The pigment dispersion composition as described in <1>, wherein Q in the above Formula (I) is an organic colorant residue selected from phthalocyanine colorant residues, quinacridone colorant residues, diketopyrrolopyrrole colorant residues, anthraquinone colorant residues and azo colorant residues.

<3> A curable color composition including the pigment dispersion composition as described in <1> or <2>, (D) a polymerizable compound and (E) a photopolymerization initiator.

<4> The curable color composition as described in <3>, further including (F) an alkali-soluble resin.

<5> A color filter including, on a substrate, a color region formed from the curable color composition as described in <3> or <4>.

<6> A method for producing a color filter, the method including: a coating layer formation process of slit-coating the curable color composition as described in <3> or <4> directly on a substrate or on a substrate with at least one other layer disposed therebetween so as to form a curable color composition coating layer; and a color region formation process of prebaking the coating layer formed, pattern-exposing the coating layer to light and thereafter performing an alkali development so as to form a patterned color region.

The (B) pigment derivative contained in the pigment dispersion composition of the invention has an organic colorant residue having an aromatic ring, and a group represented by —SO$_3$H or —COOH or a salt structure such as a metal salt thereof, as a result of which the (B) pigment derivative has excellent absorptivity to a pigment and excellent affinity for a dispersant. A curable color composition obtained using the pigment dispersion composition is excellent in coating properties, particularly the state of the coating surface formed by slit coating, and is capable of forming a uniform color region. Therefore, the curable color composition is suitable for use in production of a color filter, especially a color filter for a solid-state imaging device that is required to have high resolution and high contrast.

Effects of the Invention

The invention provides a pigment dispersion composition having high pigment dispersibility and having high dispersion stability after dispersing, and a curable color composition which contains the pigment dispersion composition, and which has excellent coating properties, and which is capable of forming a uniform coating film suitable for producing a color filter.

The invention further provides a color filter which can be obtained using the curable color composition, and which is capable of obtaining high contrast, and which has a color region having suppressed color unevenness, particularly a color filter which has reduced color unevenness and excellent color separation, and which are suitable for solid-state imaging device applications, and a method for producing the same.

BEST MODE FOR CARRYING OUT THE INVENTION

The pigment dispersion composition of the present invention, and a curable color composition and a color filter, each of which uses the pigment dispersion composition, are described in detail below.

Pigment Dispersion Composition

The pigment dispersion composition of the invention includes (A) an organic pigment, (B) a pigment derivative represented by Formula (I) and (C) a polymer compound having a pigment-adsorptive functional group. The pigment dispersion composition of the invention generally includes a solvent, and may be configured to further include other additives if necessary. The respective components are described in detail below.

(A) Organic Pigment

Various conventionally known organic pigments may be used as a pigment contained in the pigment dispersion composition of the invention. Considering that the organic pigment preferably has high transmittance, it is preferable to use a pigment having a minute particle size which has a smallest particle diameter possible. When also considering achievement of favorable handling properties of the pigment, the average primary particle diameter of the pigment is preferably from 0.01 μm to 0.3 μm, and more preferably from 0.01 μm to 0.15 μm. An average primary particle diameter within the above range causes the pigment dispersion composition to have high transmittance and improved color characteristics, and is effective in forming a color filter having high contrast by using the pigment dispersion composition.

The average primary particle diameter of the pigment is obtained by: observing under a scanning electron microscope (SEM) or a transmission electron microscope (TEM), measuring particle sizes of 100 particles in a region at which particles do not aggregate, and determining the average value thereof.

Examples of the organic pigment include:

C.I. Pigment Red 1, 2, 3, 4, 5, 6, 7, 9, 10, 14, 17, 22, 23, 31, 38, 41, 48:1, 48:2, 48:3, 48:4, 49, 49:1, 49:2, 52:1, 52:2, 53:1, 57:1, 60:1, 63:1, 66, 67, 81:1, 81:2, 81:3, 83, 88, 90, 105, 112, 119, 122, 123, 144, 146, 149, 150, 155, 166, 168, 169, 170, 171, 172, 175, 176, 177, 178, 179, 184, 185, 187, 188, 190, 200, 202, 206, 207, 208, 209, 210, 216, 220, 224, 226, 242, 246, 254, 255, 264, 270, 272, 279;

C.I. Pigment Yellow 1, 2, 3, 4, 5, 6, 10, 11, 12, 13, 14, 15, 16, 17, 18, 20, 24, 31, 32, 34, 35, 35:1, 36, 36:1, 37, 37:1, 40, 42, 43, 53, 55, 60, 61, 62, 63, 65, 73, 74, 77, 81, 83, 86, 93, 94, 95, 97, 98, 100, 101, 104, 106, 108, 109, 110, 113, 114, 115, 116, 117, 118, 119, 120, 123, 125, 126, 127, 128, 129, 137, 138, 139, 147, 148, 150, 151, 152, 153, 154, 155, 156, 161, 162, 164, 166, 167, 168, 169, 170, 171, 172, 173, 174, 175, 176, 177, 179, 180, 181, 182, 185, 187, 188, 193, 194, 199, 213, 214;

C.I. Pigment Orange 2, 5, 13, 16, 17:1, 31, 34, 36, 38, 43, 46, 48, 49, 51, 52, 55, 59, 60, 61, 62, 64, 71, 73;

C.I. Pigment Green 7, 10, 36, 37;

C.I. Pigment Blue 1, 2, 15, 15:1, 15:2, 15:3, 15:4, 15:6, 16, 22, 60, 64, 66, 79, a product obtained by replacing a Cl substituent of C.I. Pigment Blue 79 by OH, 80;

C.I. Pigment Violet 1, 19, 23, 27, 32, 37, 42;

C.I. Pigment Brown 25, 28; and

C.I. Pigment Black 1, 7.

Of these, examples of pigments that can be preferably used include the following. However, the scope of the pigment in the invention is not limited thereto.

C.I. Pigment Yellow 11, 24, 108, 109, 110, 138, 139, 150, 151, 154, 167, 180, 185;

C.I. Pigment Orange 36, 71;

C.I. Pigment Red 122, 150, 171, 175, 177, 209, 224, 242, 254, 255, 264;

C.I. Pigment Violet 19, 23, 32;

C.I. Pigment Blue 15:1, 15:3, 15:6, 16, 22, 60, 66;

C.I. Pigment Green 7, 36, 37; and

C.I. Pigment Black 1, 7.

Acquisition of Finer Pigment

In the invention, an organic pigment composed of fine and uniformized particles can be used if necessary. The acquisition of finer pigment is achieved through the processes of preparing a high-viscosity liquid composition from the pigment, a water-soluble organic solvent and a water-soluble inorganic salt, and grinding the pigment by applying a stress using, for example, a wet-crushing apparatus or the like.

Examples of the water-soluble organic solvent used in the process of obtaining a finer pigment include methanol, ethanol, isopropanol, n-propanol, isobutanol, n-butanol, ethylene glycol, diethylene glycol, diethylene glycol monomethyl ether, diethylene glycol monoethyl ether, diethylene glycol monobutyl ether, propylene glycol, and propylene glycol monomethyl ether acetate.

Other solvents that have low water-solubility or no water-solubility may be used as long as the amount thereof is so small that the solvents are adsorbed to the pigment and do not flow into waste water; examples thereof include benzene, toluene, xylene, ethylbenzene, chlorobenzene, nitrobenzene, aniline, pyridine, quinoline, tetrahydrofuran, dioxane, ethyl acetate, isopropyl acetate, butyl acetate, hexane, heptane, octane, nonane, decane, undecane, dodecane, cyclohexane, methylcyclohexane, halogenated hydrocarbon, acetone, methyl ethyl ketone, methyl isobutyl ketone, cyclohexanone, dimethylformamide, dimethylsulfoxide and N-methylpyrrolidone.

For the process of obtaining a finer pigment, only a single solvent may be used, or two or more solvents may be mixed and used if necessary.

In the invention, examples of the water-soluble inorganic salt used in the process of obtaining a finer pigment include sodium chloride, potassium chloride, calcium chloride, barium chloride and sodium sulfate.

The amount, in terms of weight, of the water-soluble inorganic salt used in the process of obtaining a finer pigment is from 1 to 50 times that of the pigment. Although a greater amount produces a stronger grinding effect, the amount of the water-soluble inorganic salt in terms of weight is more preferably from 1 to 10 times that of the pigment from the viewpoint of favorable productivity. The moisture content of the water-soluble inorganic salt used in the process of obtaining a finer pigment is preferably 1% by weight or lower.

The amount of the water-soluble organic solvent used in the process of obtaining a finer pigment is preferably from 5% by mass to 80% by mass, more preferably from 10% by mass to 60% by mass, and still more preferably from 15% by mass to 50% by mass, relative to the water-soluble inorganic salt.

There are no particular limitations on the operation conditions of the wet-crushing apparatus in the process of obtaining a finer pigment. In order to perform effective grinding with a grinding medium, the operation conditions when the apparatus is a kneader are such that the rotation number of the blade in the apparatus is preferably from 10 rpm to 200 rpm, and the ratio between the rotations of the two axes is preferably relatively high due to greater grinding effects achieved thereby. The total operation time, including dry crushing time, is preferably from 1 hour to 8 hours, and the internal temperature of the apparatus is preferably from 50° C. to 150° C. It is preferable that the water-soluble inorganic salt as a crushing medium has a sharp particle diameter distribution in the crushed particle size range of from 5 μm to 50 μm and has a spherical shape.

Mixing of Pigments (Color Matching)

A single organic pigment may be used, or organic pigments may be used in various combinations in order to increase color purity. Specific examples of the combinations are described below. For example, a mixture of a red pigment (for example, one of an anthraquinone pigment, a perylene pigment or a diketopyrrolopyrrole pigment, or at least one of an anthraquinone pigment, a perylene pigment or a diketopyrrolopyrrole pigment) and a pigment (for example, a disazo yellow pigment, an isoindoline yellow pigment, or a quinophthalone yellow pigment, or a perylene red pigment, an anthraquinone red pigment, or a diketopyrrolopyrrole red pigment) may be used as a pigment in red. For example, examples of the anthraquinone pigment include C.I. Pigment Red 177, examples of the perylene pigment include C.I. Pigment Red 155 and C.I. Pigment Red 224, and examples of the diketopyrrolopyrrole pigment include C.I. Pigment Red 254. From the viewpoint of favorable color reproduction properties, a mixture of a red pigment and C.I. Pigment Yellow 83, C.I. Pigment Yellow 139 or C.I. Pigment Red 177 is preferable. The mass ratio of red pigment to other pigments is preferably from 100:5 to 100:80. When the mass ratio is 100:(4 or less), there are cases in which the light transmittance at from 400 nm to 500 nm is difficult to regulate and the color purity cannot be raised. When the mass ratio is 100:(81 or more), there are cases in which coloring power decreases. The mass ratio is most suitably in the range of from 100:10 to 100:65. When red pigments are combined with each other, the mass ratio therebetween may be controlled in accordance with chromaticity.

As a green pigment, a halogenated phthalocyanine pigment may be used alone, or may be used in a mixture with a disazo yellow pigment, a quinophthalone yellow pigment, an azomethine yellow pigment or an isoindoline yellow pigment. For example, mixtures of C.I. Pigment Green 7, 36, 37 and C.I. Pigment Yellow 83, C.I. Pigment Yellow 138, C.I. Pigment Yellow 139, C.I. Pigment Yellow 150, C.I. Pigment Yellow 180 or C.I. Pigment Yellow 185 are preferable examples thereof. The mass ratio of green pigment to yellow pigment is preferably from 100:5 to 100:200. When the mass ratio is 100:(less than 5), there are cases in which the light transmittance at from 400 to 450 nm is difficult to regulate and the color purity cannot be increased. When the mass ratio is 100:(more than 200), there are cases in which the dominant wavelength is closer to the longer wavelength side and deviation from a NTSC target hue is large. The mass ratio is particularly preferably in the range of from 100:20 to 100:150.

As a blue pigment, a phthalocyanine pigment may be used alone, or may be used in a mixture with a dioxazine purple pigment. Particularly preferable examples include a mixture of C.I. Pigment Blue 15:6 and C.I. Pigment Violet 23.

The mass ratio of blue pigment to purple pigment is preferably from 100:0 to 100:100, and more preferably from 100:(70 or less).

As a pigment preferable for use in black matrix applications, carbon black, graphite, titanium black, iron oxide or titanium oxide may be used alone, or two or more thereof may be mixed and used. A combination of carbon black and titanium black is preferable.

The mass ratio of carbon black to titanium black is preferably from 100:0 to 100:60. When the mass ratio is 100:(61 or more), dispersion stability decreases in some cases.

Inorganic Pigment

Together with the organic pigment, various conventionally known inorganic pigments may also be incorporated into the pigment dispersion composition of the invention depending on the purpose, as long as the effects of the invention are not impaired. Examples of the inorganic pigments include metal compounds such as metal oxides and metal complex salts. Specific examples of the inorganic pigments include oxides of metals such as iron, cobalt, aluminum, cadmium, lead, copper, titanium, magnesium, chromium, zinc and antimony, and complex oxides of the above metals.

Dye

In the invention, a dye may be used, together with the organic pigment, as a colorant so as to, for example, adjust the color tone.

There are no particular limitations on dyes that can be used as colorants, and known dyes that have been used in color filter applications can be used. Examples thereof include dyes described in JP-A No. 64-90403, JP-A No. 64-91102, JP-A No. 1-94301, JP-A No. 6-11614, Japanese Patent No. 2592207, U.S. Pat. No. 4,808,501, U.S. Pat. No. 5,667,920, U.S. Pat. No. 5,059,500, JP-A No. 5-333207, JP-A No. 6-35183, JP-A No. 6-51115, JP-A No. 6-194828, JP-A No. 8-211599, JP-A No. 4-249549, JP-A No. 10-123316, JP-A No. 11-302283, JP-A No. 7-286107, JP-A No. 2001-4823, JP-A No. 8-15522, JP-A No. 8-29771, JP-A No. 8-146215, JP-A No. 11-343437, JP-A No. 8-62416, JP-A No. 2002-14220, JP-A No. 2002-14221, JP-A No. 2002-14222, JP-A No. 2002-14223, JP-A No. 8-302224, JP-A No. 8-73758, JP-A No. 8-179120, and JP-A No. 8-151531.

Examples of the chemical structure of the dye include a pyrazole azo compound, an anilino azo compound, a triphenylmethane compound, an anthraquinone compound, an anthrapyridone compound, a benzylidene compound, an oxonol compound, a pyrazolotriazol azo compound, a pyridone azo compound, a cyanine compound, a phenothiazine compound, a pyrrolopyrazole azomethine compound, a xanthene compound, a phthalocyanine compound, a benzopyrane compound, and an indigo compound.

Pigment Concentration

The content of organic pigment in the pigment dispersion composition is preferably from 30% by mass to 85% by mass, and more preferably from 45% by mass to 80% by mass, with respect to the total solids content (mass) of the composition.

An organic pigment content within the above range provides sufficient color density, and is effective in ensuring excellent color characteristics.

When one or more inorganic pigments are additionally used, the amount thereof is preferably 100 parts by mass or less relative to 100 parts by mass of organic pigment, and is preferably from 0.1% by mass to 50% by mass relative to the total amount of pigments.

(B) Pigment Derivative Represented by Formula (I)

The pigment dispersion composition of the present invention includes a pigment derivative represented by the following Formula (I). The pigment derivative is hereinafter referred to as "specific pigment derivative".

Combined use of the (B) specific pigment derivative and the below-described (C) polymer compound having a pigment-adsorptive functional group allows the (A) organic pigment to be dispersed, in fine particle state, in the pigment dispersion composition, and prevents reaggregation thereof. A curable color composition containing the pigment dispersion composition is capable of forming a uniform cured color film with an excellent hue, and therefore is useful for producing a color filter having high contrast and excellent transparency.

The specific pigment derivative has an acid group. The specific pigment derivative may take the form of a metal salt of the acid group, an ammonium salt of the acid group or an amine salt of the acid group.

Formula (I)

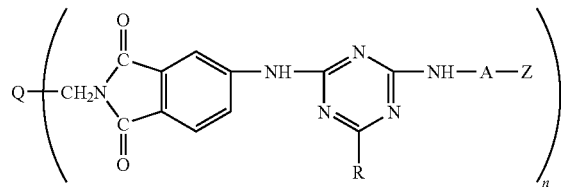

In Formula (I), Q represents an organic colorant residue having an aromatic ring; A represents an ethylene group, a phenylene group or a naphthylene group; and R represents a hydroxyl group or a group represented by —NH-A-Z; Z represents a substituent selected from —$SO_3H$, —COOH or a metal, ammonium or amine salt thereof; and n represents an integer of from 1 to 4. When R represents —NH-A-Z, in the two —NH-A-Zs bonded to the triazine ring contained in each of the n partial structures (the structure in parentheses) bonded to Q in Formula (I), the groups represented by the two As may be the same as each other or different from each other, and the substituents represented by the two Zs may be the same as each other or different from each other. In other words, the structures represented by the two —NH-A-Zs may be the same as each other or different from each other.

Q represents an organic colorant residue having an aromatic group. Since Q has an aromatic ring, introduction of an aminophthalimidomethyl group is facilitated, which is preferable.

The organic colorant structure of the organic colorant residue Q having an aromatic ring may derive from either of a pigment or a dye.

In particular, an organic colorant residue selected from the group consisting of a phthalocyanine colorant residue, a quinacridone colorant residue, a diketopyrrolopyrrole colorant residue, an anthraquinone colorant residue and an azo colorant residue is preferable from the viewpoints of hue and ease of introduction of an aminophthalimidomethyl group. When an azo colorant residue is used as the organic colorant residue, an azo colorant residue that do not exhibit decomposition or a change of hue in a concentrated sulfuric acid when introducing an aminophthalimidomethyl group is preferably selected.

A in Formula (I) represents an ethylene group, a phenylene group or a naphthylene group. The ethylene group, phenylene group or naphthylene group may have a substituent, and preferable substituents that can be introduced include a halogen atom, an alkyl group, an aryl group, an alkoxy group and a hydroxyl group.

From the viewpoint of favorable dispersibility, A is preferably a phenylene group.

R represents a hydroxyl group or a group represented by —NH-A-Z, wherein A has the same definition as described above, and Z is a substituent selected from a group represented by —SO$_3$H or —COOH or a metal, ammonium or amine salt thereof. When R represents —NH-A-Z, in the two —NH-A-Zs bonded to the triazine ring contained in each of the n partial structures (the structure in parentheses) bonded to Q in Formula (I), the groups represented by the two As may be the same as each other or different from each other, and the substituents represented by the two Zs may be the same as each other or different from each other. In other words, the structures represented by the two —NH-A-Zs may be the same as each other or different from each other.

Representative examples of an aliphatic or aromatic amine that has one sulfone group as Z and serves as a —NH-A-Z group in Formula (I) include taurine, sulfanilic acid, metanilic acid, orthanilic acid, naphthionic acid, tobias acid, 2-aminophenol-4-sulfonic acid, 2-methoxyaniline-5-sulfonic acid, 4-chloroaniline-3-sulfonic acid, 2-nitroaniline-4-sulfonic acid, 4B acid (p-toluidine-m-sulfonic acid), 2B acid (o-chloro-p-toluidine-m-sulfonic acid), C acid (3-amino-6-chlorotoluene-4-sulfonic acid), CB acid (3-amino-6-chlorobenzoic acid-4-sulfonic acid) and γ acid (2-amino-8-naphthol-6-sulfonic acid).

Representative examples of an aromatic amine which serves as a —NH-A-Z group and in which A is a phenylene group and the Z group has one carboxyl group include anthranilic acid (o-aminobenzoic acid), m-aminobenzoic acid and p-aminobenzoic acid.

When the compound represented by Formula (I) is a metal salt, examples of the metal include Mn, Sr, Ba, Ca and Al. When the compound represented by Formula (I) forms an amine salt, examples of the amine include dehydroabietylamine and stearylamine.

It is preferable that the (B) specific pigment derivative in the invention does not have, in the molecule thereof, a sulfonic acid group or carboxylic group that is in the form of a salt.

In Formula (I), n represents an integer of from 1 to 4, and represents preferably an integer of 1 or 2.

More specifically, the specific pigment derivative preferably has a structure in which, in Formula (I), R is a hydroxyl group and —NH-A-Z is —NH-Ph-SO$_3$H. Here, Q is preferably suitably selected from phthalocyanine colorant residues, quinacridone colorant residues, diketopyrrolopyrrole colorant residues, anthraquinone colorant residues and azo colorant residues, and is preferably so selected that Q has a colorant skeleton which is the same as or similar to the colorant skeleton possessed by the (A) organic pigment to be used together, from the viewpoint of effect.

Specific examples (specific pigment derivatives (a) to (l)) of the (B) specific pigment derivative according to the invention are shown below; however, specific examples of the (B) specific pigment derivative are not limited thereto. Here, n is within the range of from 1 to 4. Here, a, b and c respectively represent integers of from 0 to 4 in pigment specific pigment derivatives (j) to (l).

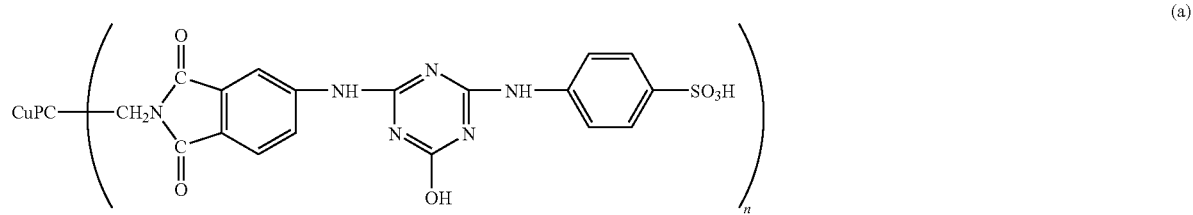

(a)

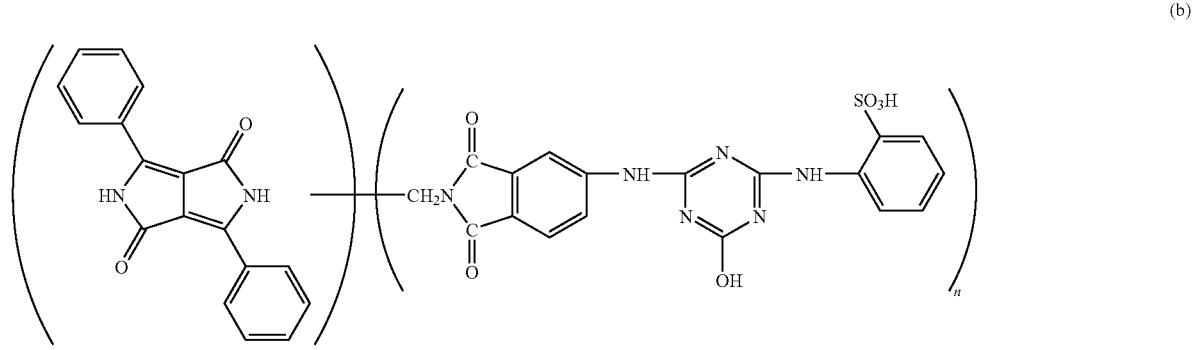

(b)

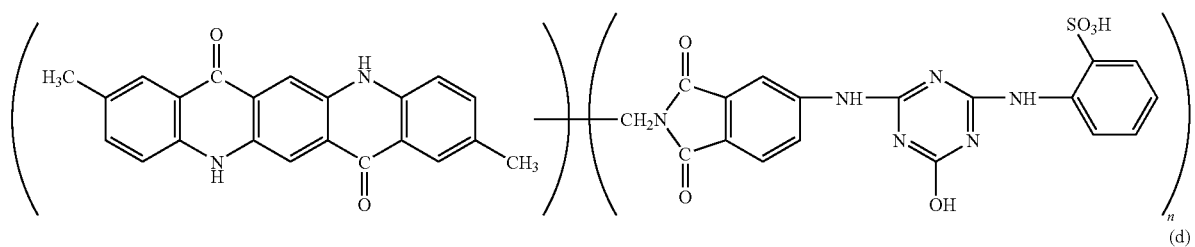
(c)
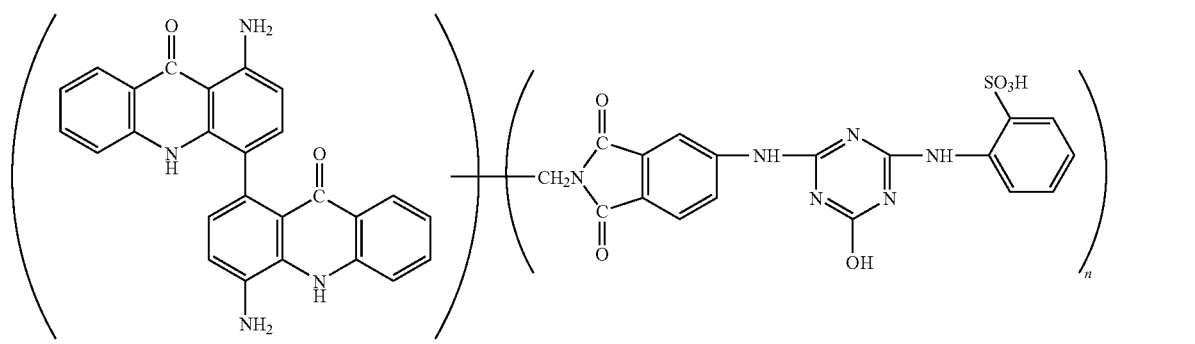
(d)
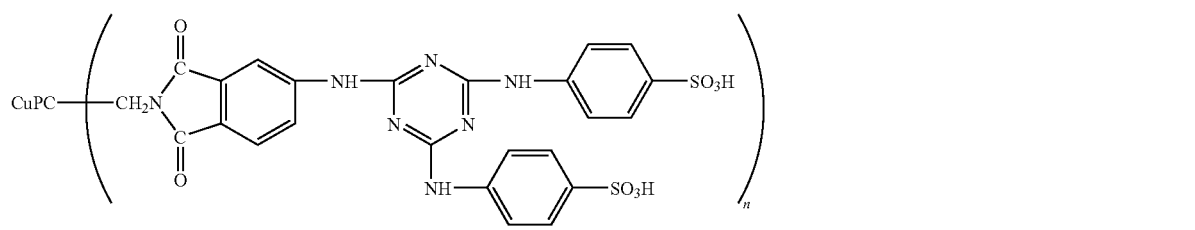
(e)
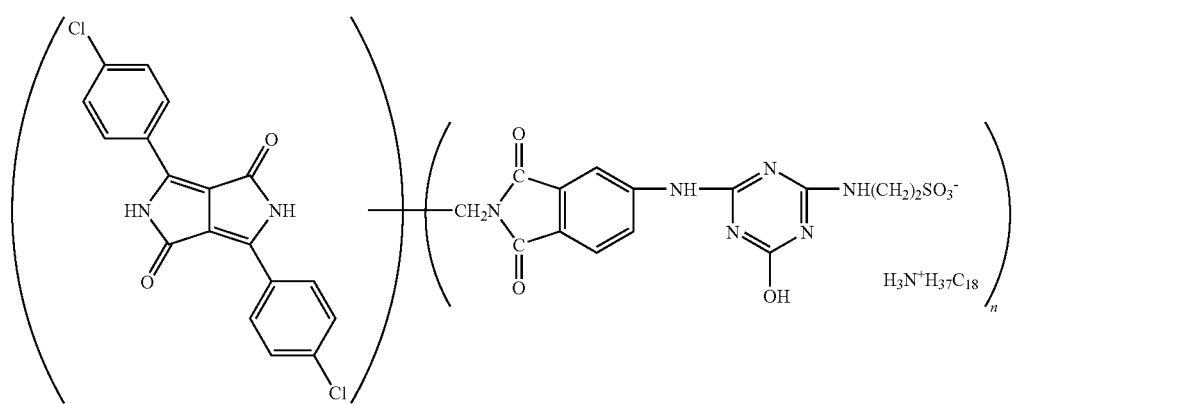
(f)
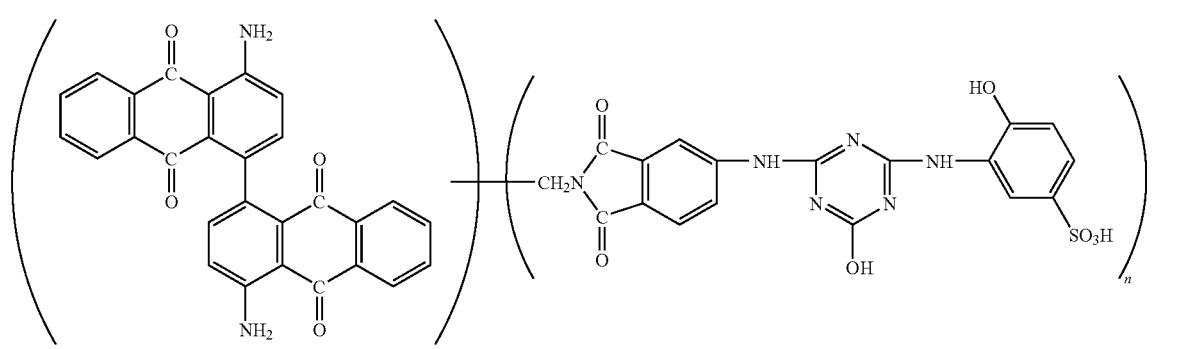
(g)

-continued
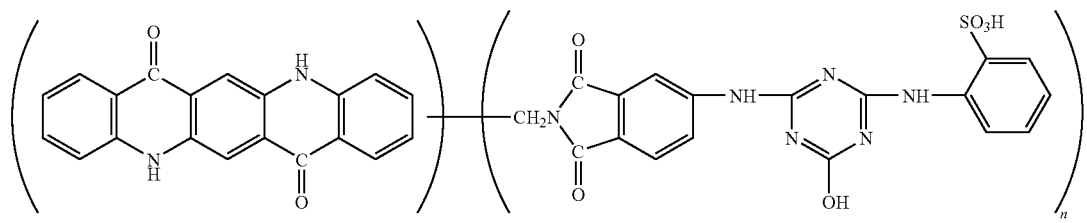
(h)
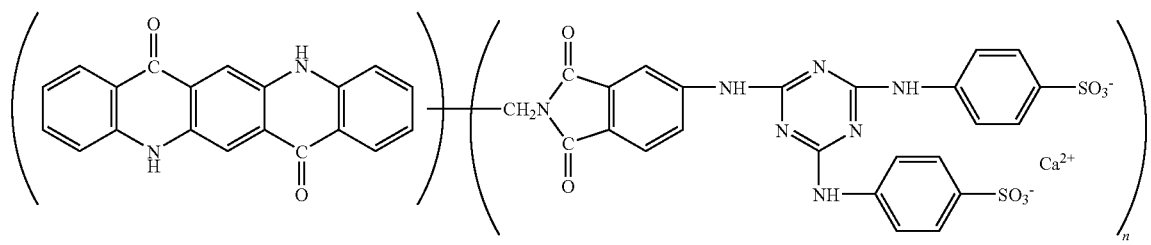
(i)
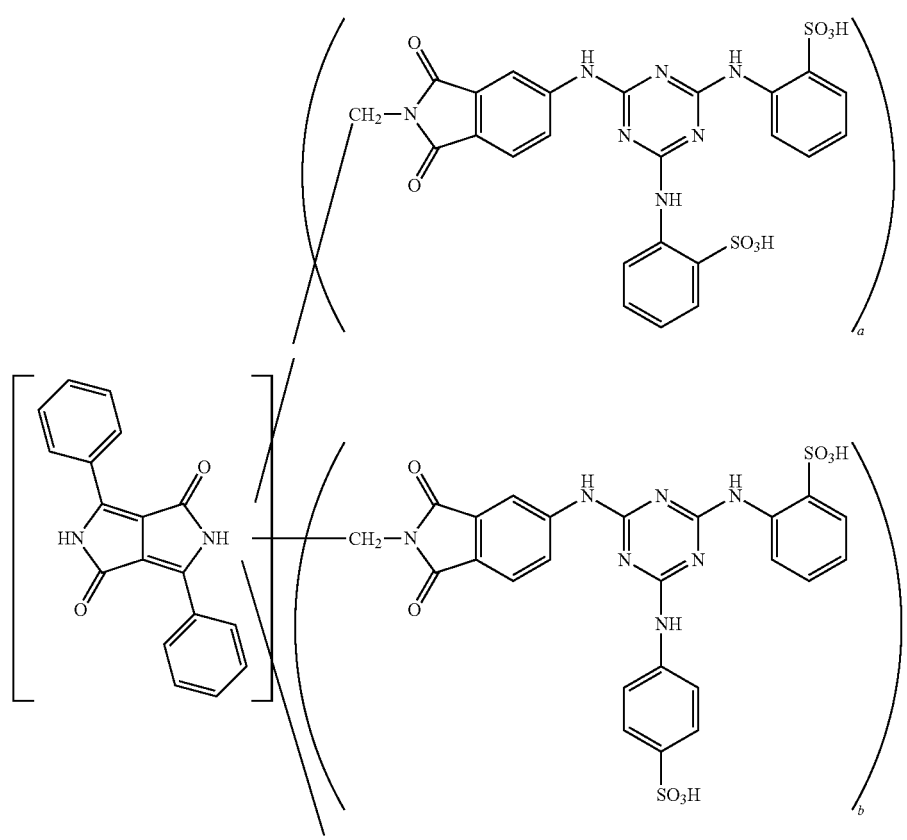
(j)

-continued
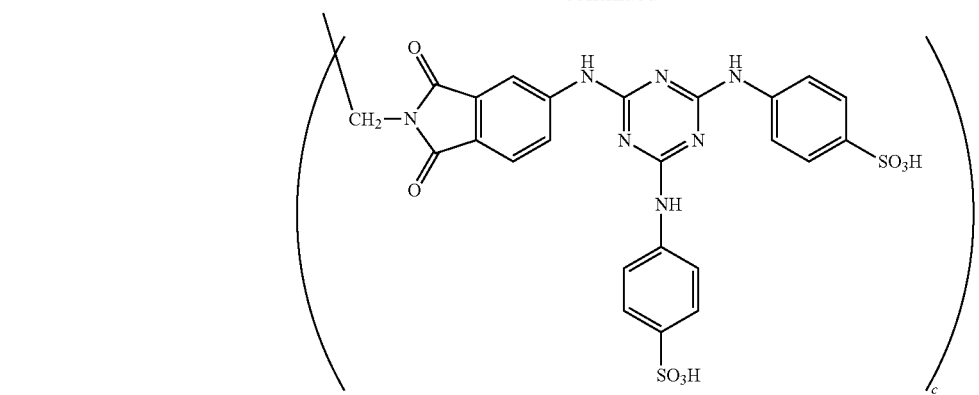
a + b + c = n
(k)
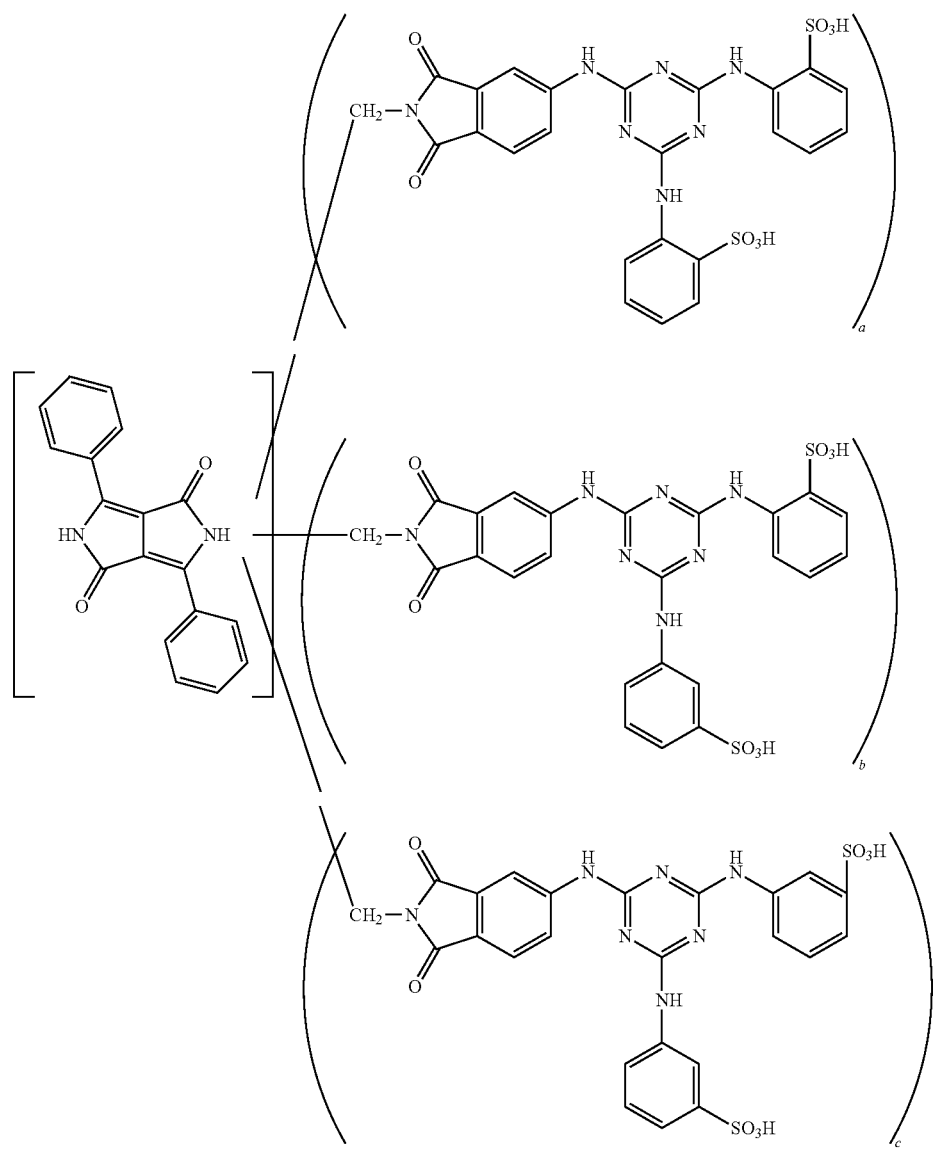
a + b + c = n

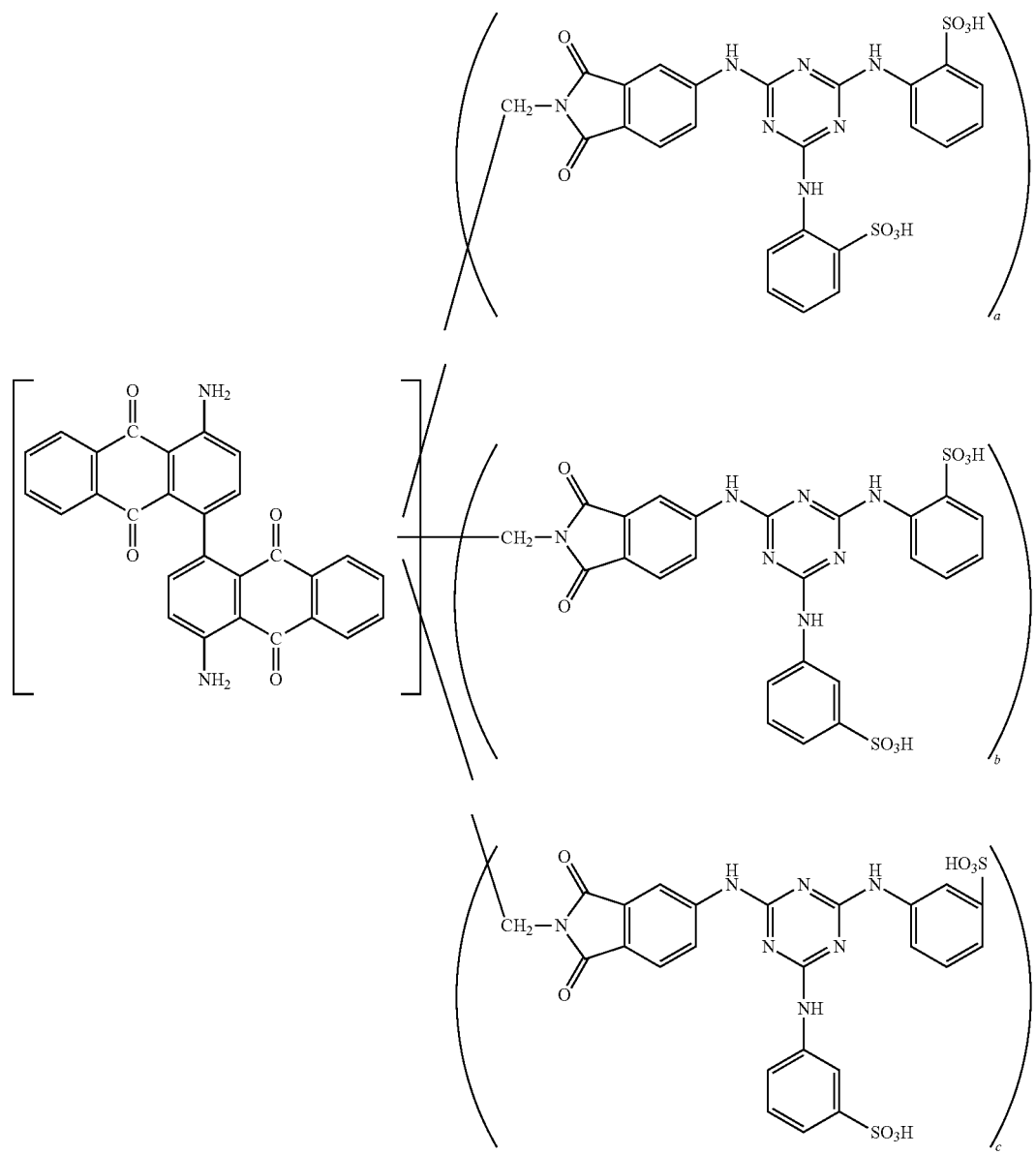

(I)

$a+b+c=n$

A 4-aminophthalimidomethylated organic colorant represented by Formula (II) may be used for production of the (B) specific pigment derivative according to the invention.

An organic colorant represented by Formula (II) is favorably obtained by adding an organic colorant, paraformaldehyde and 4-aminophthalimide to concentrated sulfuric acid, and heating the resultant thereby introducing 4-aminophthalimidomethyl group(s) into the organic colorant. However, organic colorants represented by Formula (II) in which 4-aminophthalimidomethyl groups are introduced by other methods may be used for the synthesis of the specific pigment derivative according to the invention.

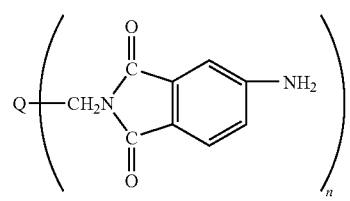

Formula (II)

In the formula, Q is an organic colorant residue having an aromatic ring, and n represents an integer of from 1 to 4. Here, Q and n have the same definitions and preferable ranges as Q and n in Formula (I), respectively.

After an organic colorant having a 4-aminophthalimidomethyl group is beforehand prepared according to the above method, the (B) specific pigment derivative is generally prepared according to the following synthesis method (1) or (2). Here, a pigment dispersant (a) having the following structure is taken as an example, and an outline of a preparation method thereof is described.

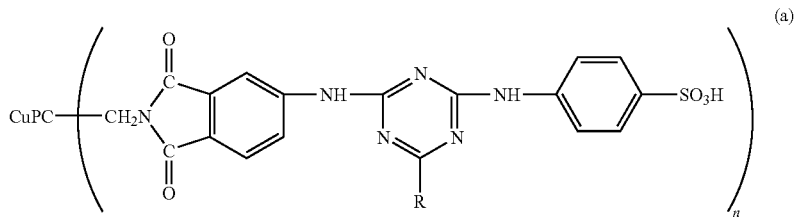

In Formula (a), CuPC represents a copper phthalocyanine residue (the same applies hereinafter).

In Synthesis Method (1), first, an amino group of a copper phthalocyanine having one 4-aminophthalimidomethyl group introduced thereto is allowed to react with cyanuric chloride, so that a compound represented by the following Formula (III) is obtained.

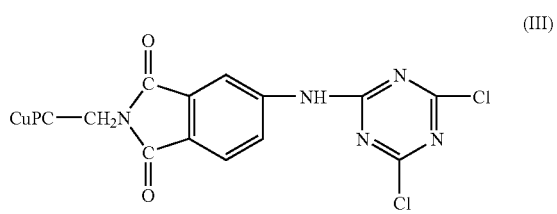

Next, after the compound represented by Formula (III) is allowed to react with one molecule of sulfanilic acid, hydrolysis is performed at the remaining one Cl, thereby obtaining specific pigment derivative (a).

In Synthesis Method (2), first, cyanuric chloride is allowed to react with an one molecule of sulfanilic acid, whereby a compound represented by the following Formula (IV) is obtained.

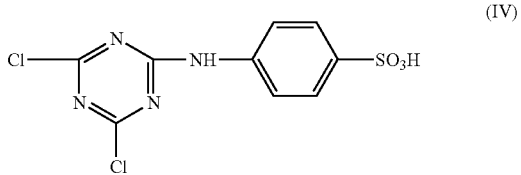

Next, after a copper phthalocyanine having one 4-aminophthalimidomethyl group introduced thereto is allowed to react with the compound (IV), hydrolysis is performed at the remaining one Cl, thereby obtaining specific pigment derivative (a).

Various preparation methods other than the above-described Synthesis Methods (1) and (2) can be adopted.

The specific pigment derivative of the invention can be prepared by introducing the above functional group into an organic pigment having a skeleton that is the same as or similar to the organic colorant to be dispersed, following the above scheme. Here, it is also possible to prepare the specific pigment derivative by using the organic pigment to be dispersed itself as a starting material.

Introduction of plural groups, each of which is the functional group described above, into the organic colorant residue having an aromatic ring and represented by Q in Formula (I) can be achieved by changing the feed ratio between organic colorant, paraformaldehyde and 4-aminophthalimide at the time of allowing them to react in concentrated sulfuric acid. This method enables regulation of the total number, n, of functional groups introduced.

The (B) specific pigment derivative in the invention exerts excellent dispersing effects and dispersion stabilization effects overall, when applied to commercially-available organic pigments. In particular, the effects exerted by the specific pigment derivative are highest when the specific pigment derivative is used with an organic pigment having a chemical structure that is the same as or similar to Q in the (B) specific pigment derivative.

The (B) pigment derivative represented by Formula (I) is preferably added at a ratio of from 0.5 to 30 parts by weight, more preferably in the range of from 2 to 25 parts by mass, relative to 100 parts by weight of (A) organic pigment. Excellent pigment dispersing effects are obtained at a content of 0.5 to 30 parts by weight relative to 100 parts of organic pigment. When the amount of the specific pigment derivative used is more than the above range, dispersing effects are not impaired; however, a significant enhancement of effects is not observed, and the organic pigment content relatively decreases. Therefore, the above content range is preferable.

The content of (B) pigment derivative represented by the above Formula (I) in the pigment dispersion composition of the invention is preferably from 0.3% by weight to 20% by weight in terms of solids content.

When the content is within the above range, dispersion can be performed well and dispersion stability after dispersing can be improved while regulating the viscosity to be low; therefore, the transmittance of the pigment dispersion composition is high, and excellent color characteristics are obtained. Accordingly, use of such a pigment dispersion composition in the production of a color filter enables formation of a color region having excellent color characteristics and allows the color filter to have high contrast.

Although the (B) specific pigment derivative and the (A) organic pigment are generally added, in powder state, into the pigment dispersion composition of the invention, the (B) specific pigment derivative as well as the (A) organic pigment may be added to a vehicle. It is also possible to add the (B) specific pigment derivative in advance when preparing the (A) organic pigment itself.

Known pigment derivatives other than the (B) specific pigment derivative may be additionally incorporated into the pigment dispersion composition of the invention, as necessary.

Preferable examples of other pigment derivatives that can be additionally incorporated include skeletons of quinacridone pigments, phthalocyanine pigments, azo pigments, quinophthalone pigments, isoindoline pigments, isoindolinone pigments, quinoline pigments, diketopyrrolopyrrole pigments and benzoimidazolon pigments. Preferable examples further include pale-yellow aromatic polycyclic compounds such as naphthalene pigments, anthraquinone pigments, triazine pigments and quinoline pigments.

Examples of colorant derivatives that can be additionally incorporated include those described in JP-A Nos. 11-49974, 11-189732, 10-245501, 2006-265528, 8-295810, 11-199796, 2005-234478, 2003-240938, and 2001-356210 and the like.

The content of known pigment derivatives that can be additionally incorporated in the pigment dispersion composition is preferably from 0 to 30 parts by mass, more preferably from 0 to 20 parts by mass, relative to 100 parts by mass of (A) organic pigment.

(C) Polymer Compound Having Pigment-Adsorptive Functional Group

The pigment dispersion composition of the invention includes at least one kind of (C) polymer compound having a pigment-adsorptive functional group (hereinafter referred to as (C) specific polymer dispersant in some cases). The (C) specific polymer dispersant is adsorbed on a pigment, and improves the dispersibility of the pigment by inhibiting reaggregation of the pigment.

The method of synthesizing the (C) polymer compound having a pigment-adsorptive functional group is not limited. The (C) polymer compound having a pigment-adsorptive functional group is obtained by, for example, homopolymerization of a monomer having a functional group capable of being adsorbed on a pigment, or copolymerization of the monomer and at least one other component.

Examples of the monomer having a functional group capable of being adsorbed on a pigment include a monomer having an organic colorant structure or a heterocyclic structure.

Examples of the monomer having an organic colorant structure or a heterocyclic structure include a monomer having a phthalocyanine colorant structure, an insoluble azo colorant structure, an azo lake colorant structure, an anthraquinone colorant structure, a quinacridone colorant structure, a dioxadine colorant structure, a diketopyrrolopyrrole colorant structure, an anthrapyridine colorant structure, an anthanthrone colorant structure, an indanthrone colorant structure, a flavanthrone colorant structure, a perinone colorant structure, a perylene colorant structure or a thioindigo colorant structure, and a monomer having a heterocyclic structure such as thiophene, furan, xanthene, pyrrole, pyrroline, pyrrolidine, dioxolane, pyrazole, pyrazoline, pyrazolidine, imidazole, oxazol, thiazol, oxadiazol, triazole, thiadiazole, pyran, pyridine, piperidine, dioxane, morpholine, pyridazine, pyrimidine, piperazine, triazine, trithiane, isoindoline, isoindolinone, benzimidazolone, benzothiazole, succinimide, phthalimide, naphthalimide, hydantoin, indole, quinoline, carbazole, acridine, acridone or anthraquinone. More specific examples include, but are not limited to, monomers of the following structures (exemplary monomers (a-1) to (a-24)).

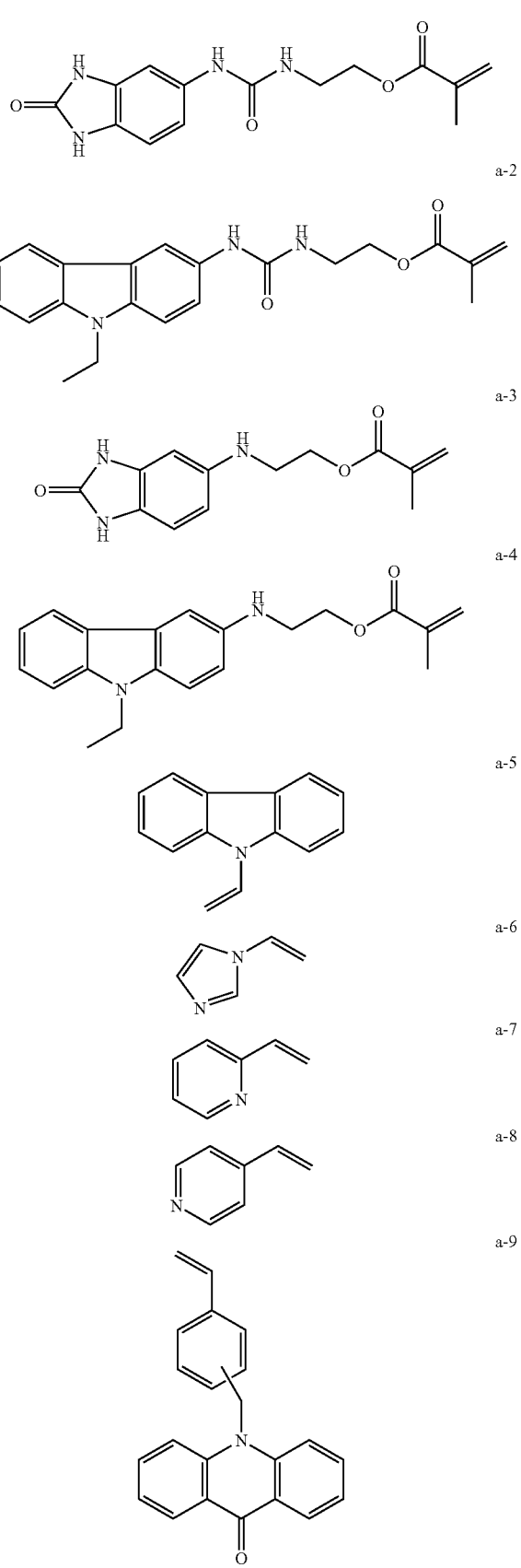

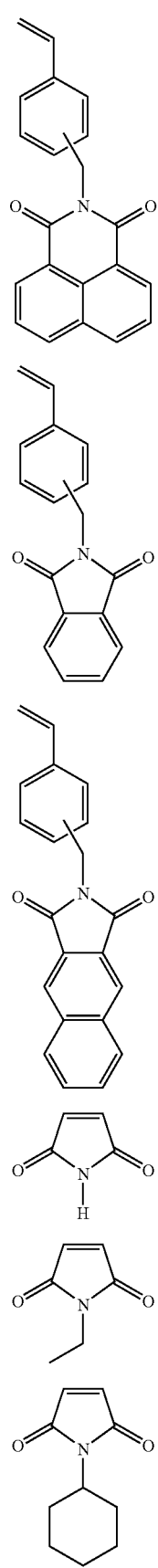
a-10
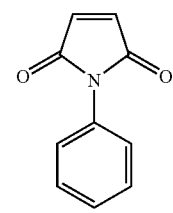
a-16
a-11
a-17
a-12
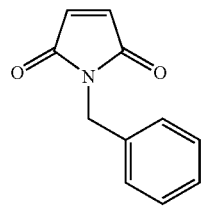
a-18
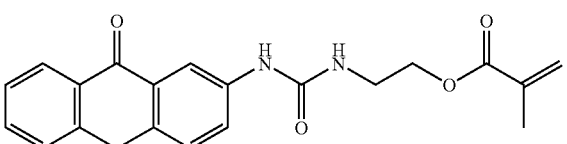
a-19
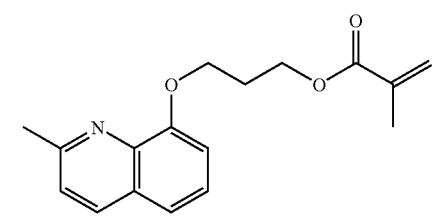
a-20
a-13
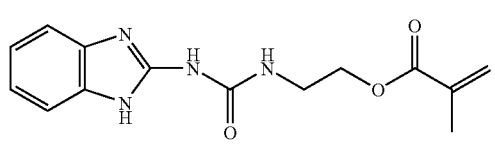
a-21
a-14
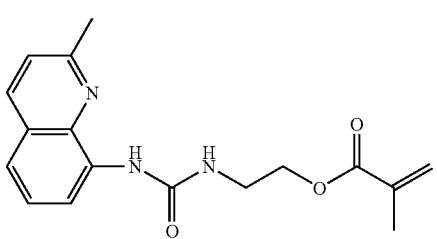
a-22
a-15

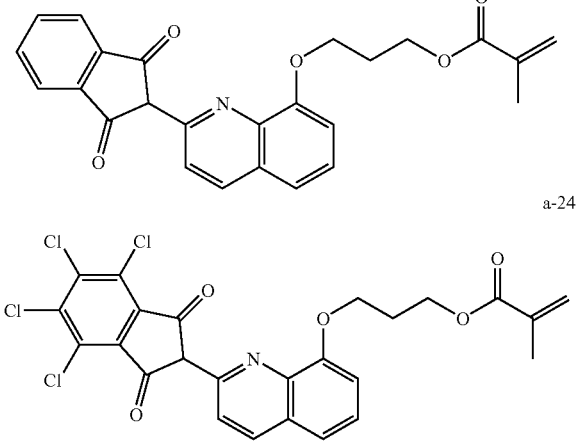

a-23 a-24

The monomer having a functional group capable of being adsorbed on a pigment may be suitably selected in accordance with the type of the pigment to be dispersed. The monomer having a functional group capable of being adsorbed on a pigment may be used singly, or in combination of two or more thereof.

The content of monomer having an organic colorant structure or a heterocyclic structure in the polymer compound having a pigment-adsorptive functional group is not particularly limited, and is preferably from 1% by weight to 80% by weight, more preferably from 3% by weight to 50% by weight, and most suitably from 5% by weight to 30% by weight. A content within the above range is preferable because, at such a content, the monomer has sufficient adsorption force onto a pigment surface, favorable dispersibility is obtained and developability does not decrease.

Examples of preferable structures of the polymer compound having a pigment-adsorptive functional group include a linear polymer, a graft polymer, a block polymer and a terminal-modified polymer.

Linear Polymer

In the invention, the linear polymer having a pigment-adsorptive functional group is obtained by, for example, homopolymerization of a monomer having a functional group capable of being adsorbed on a pigment, or copolymerization of the monomer with one or more other components. When a copolymer obtained by the copolymerization is used, examples of compounds that are copolymerized with the above monomer include the following compounds (1) to (15):

(1) acrylic esters having an aliphatic hydroxyl group and methacrylic esters having an aliphatic hydroxyl group, such as 2-hydroxyethyl acrylate, 2-hydroxypropyl acrylate, 3-hydroxyproyl acrylate, 4-hydroxybutyl acrylate, 2-hydroxyethyl methacrylate, 2-hydroxypropyl methacrylate, 3-hydroxypropyl methacrylate and 4-hydroxybutyl methacrylate;

(2) alkyl acrylates such as methyl acrylate, ethyl acrylate, propyl acrylate, butyl acrylate, isobutyl acrylate, amyl acrylate, hexyl acrylate, 2-ethylhexyl acrylate, octyl acrylate, benzyl acrylate, 2-chloroethyl acrylate, glycidyl acrylate, 3,4-epoxycyclohexylmethyl acrylate, vinyl acrylate, 2-phenylvinyl acrylate, 1-propenyl acrylate, allyl acrylate, 2-allyloxyethyl acrylate, and propargyl acrylate;

(3) alkyl methacrylates such as methyl methacrylate, ethyl methacrylate, propyl methacrylate, butyl methacrylate, isobutyl methacrylate, amyl methacrylate, hexyl methacrylate, 2-ethylhexyl methacrylate, cyclohexyl methacrylate, benzyl methacrylate, 2-chloroethyl methacrylate, glycidyl methacrylate, 3,4-epoxycyclohexylmethyl methacrylate, vinyl methacrylate, 2-phenylvinyl methacrylate, 1-propenyl methacrylate, allyl methacrylate, 2-allyloxyethyl methacrylate, and propargyl methacrylate;

(4) acrylamides or methacrylamides such as acrylamide, methacrylamide, N-methylolacrylamide, N-ethylacrylamide, N-hexylmethacrylamide, N-cyclohexylacrylamide, N-hydroxyethylacrylamide, N-phenylacrylamide, N-nitrophenylacrylamide, N-ethyl-N-phenylacrylamide, vinyl acrylamide, vinyl methacrylamide, N,N-diallylacrylamide, N,N-diallylmethacrylamide, allylacrylamide, and allylmethacrylamide;

(5) vinyl ethers such as ethyl vinyl ether, 2-chloroethyl vinyl ether, hydroxyethyl vinyl ether, propyl vinyl ether, butyl vinyl ether, octyl vinyl ether, and phenyl vinyl ether;

(6) vinyl esters such as vinyl acetate, vinyl chloroacetate, vinyl butyrate, and vinyl benzoate;

(7) styrenes such as styrene, α-methylstyrene, methylstyrene, chloromethylstyrene, and p-acetoxystyrene;

(8) vinyl ketones such as methyl vinyl ketone, ethyl vinyl ketone, propyl vinyl ketone, and phenyl vinyl ketone;

(9) olefins such as ethylene, propylene, isobutylene, butadiene, and isoprene;

(10) N-vinylpyrrolidone, acrylonitrile, methacrylonitrile, and the like;

(11) unsaturated imides such as maleimide, N-acryloylacrylamide, N-acetylmethacrylamide, N-propionylmethacrylamide, and N-(p-chlorobenzoyl)methacrylamide; and

(12) methacrylic monomers in which a hetero atom is bonded to the α-position, such as the compounds described in Japanese Patent Application Nos. 2001-115595 and 2001-115598.

(13) Monomer Having Acidic Group

Preferable examples of monomers that can be copolymerized also include monomers having an acidic group.

Examples of monomers having an acidic group include vinyl monomers having a carboxyl group and vinyl monomers having a sulfonic acid group.

Examples of vinyl monomers having a carboxyl group include (meth)acrylic acid, vinylbenzoic acid, maleic acid, monoalkyl maleate, fumaric acid, itaconic acid, crotonic acid, cinnamic acid and an acrylic acid dimer. Further examples include: an addition product of a monomer having a hydroxyl group such as 2-hydroxyethyl(meth)acrylate and a cyclic anhydride such as maleic anhydride, phthalic anhydride or cyclohexanedicarboxylic anhydride; and ω-carboxy-polycaprolactone mono(meth)acrylate. It is also possible to use an anhydride-containing monomer, such as maleic anhydride, itaconic anhydride or citraconic anhydride, which serves as a precursor of a carboxyl group. Of these, (meth)acrylic acid is particularly preferable from the viewpoints of copolymerizability, cost, solubility and the like.

In the present specification, an expression "(meth)acryl" is used for indicating either acryl or methacryl or both, and an expression "(meth)acrylate" is used for indicating either acrylate or methacrylate or both.

Examples of vinyl monomers having a sulfonic acid group include 2-acrylamide-2-methylpropanesulfonic acid. Examples of vinyl monomers having a phosphoric acid group include mono(2-acryloyloxyethyl) phosphate and mono(1-methyl-2-acryloyloxyethyl) phosphate.

(14) Monomer Having Basic Nitrogen Atom

Monomers having a basic nitrogen atom are also preferable examples of copolymerizable monomers. Examples of monomers having a basic nitrogen atom include monomers having a nitrogen-containing heterocycle, and (meth)acrylic esters having a basic nitrogen, (meth)acrylamides having a basic nitrogen and styrenes having a basic nitrogen.

Examples of the monomers having a nitrogen-containing heterocycle include vinylpyridine, vinylimidazole and vinyltriazole. Examples of the (meth)acrylic esters include N,N-dimethylaminoethyl(meth)acrylate, N,N-dimethylaminopropyl(meth)acrylate, 1-(N,N-dimethylamino)-1,1-dimethylmethyl(meth)acrylate, N,N-dimethylaminohexyl (meth)acrylate, N,N-diethylaminoethyl(meth)acrylate, N,N-diisopropylaminoethyl(meth)acrylate, N,N-di-n-butylaminoethyl(meth)acrylate, N,N-di-1-butylaminoethyl (meth)acrylate, morpholinoethyl(meth)acrylate, piperidinoethyl(meth)acrylate, 1-pyrrolidinoethyl(meth) acrylate, N,N-methyl-2-pyrrolidylaminoethyl(meth)acrylate and N,N-methylphenylaminoethyl(meth)acrylate.

Examples of the (meth)acrylamides include N—(N',N'-dimethylaminoethyl)acrylamide, N—(N',N'-dimethylaminoethyl)methacrylamide, N—(N',N'-diethylaminoethyl) acrylamide, N—(N',N'-diethylaminoethyl)methacrylamide, N—(N',N'-dimethylaminopropyl)acrylamide, N—(N',N'-dimethylaminopropyl)methacrylamide, N—(N',N'-diethylaminopropyl)acrylamide, N—(N',N'-diethylaminopropyl)methacrylamide, 2-(N,N-dimethylamino)ethyl(meth) acrylamide, 2-(N,N-diethylamino)ethyl(meth)acrylamide, 3-(N,N-diethylamino)propyl(meth)acrylamide, 3-(N,N-dimethylamino)propyl(meth)acrylamide, 1-(N,N-dimethylamino)-1,1-dimethylmethyl(meth)acrylamide, 6-(N,N-diethylamino)hexyl(meth)acrylamide, morpholino(meth) acrylamide, piperidino(meth)acrylamide and N-methyl-2-pyrrolidyl(meth)acrylamide. Examples of the styrenes include N,N-dimethylaminostyrene and N,N-dimethylaminomethylstyrene.

(15) Other Monomers

Regarding other usable monomers, it is possible to use a monomer having a urea group, a urethane group, a hydrocarbon group having 4 or more carbon atoms and containing a coordinating oxygen atom, an alkoxysilyl group, an epoxy group, an isocyanate group or a hydroxyl group. Specifically, examples include monomers of the following structures (exemplary monomers (a-25) to (a-36)).

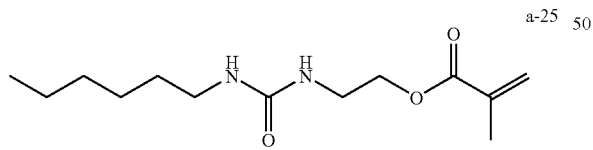

a-25

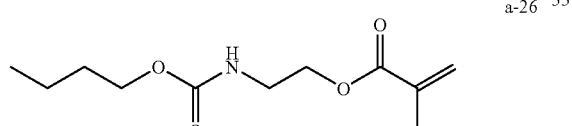

a-26

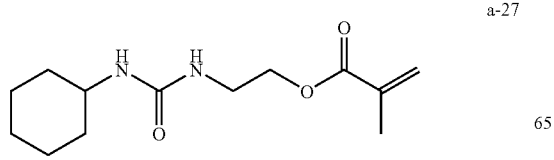

a-27

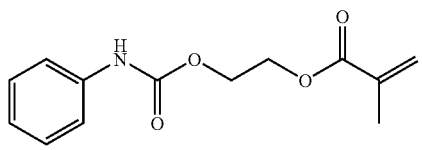

a-28

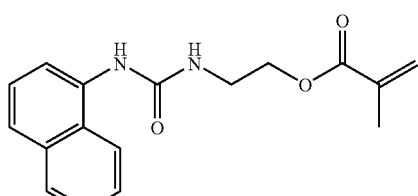

a-29

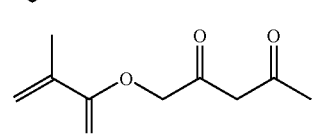

a-30

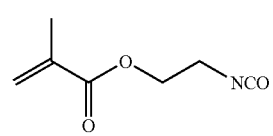

a-31

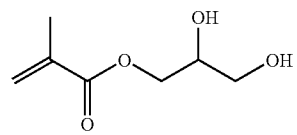

a-32

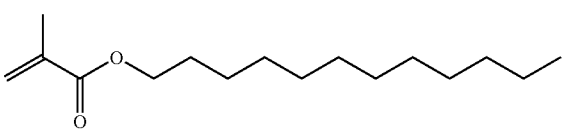

a-33 a-34

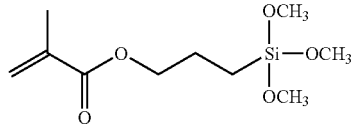

a-35

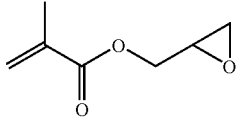

a-36

Examples of copolymerizable monomers further include monomers containing an ionic functional group (ionic vinyl monomers).

Regarding examples of ionic vinyl monomers (anionic vinyl monomers and cationic vinyl monomers), examples of anionic vinyl monomers include alkali metal salts of the above-described vinyl monomers having an acidic group, and salts between the vinyl monomers having an acidic group and organic amines (for example, tertiary amines such as triethylamine and dimethylaminoethanol). Examples of cationic vinyl monomers include monomers obtained by quaternizing the above-described nitrogen-containing vinyl monomers with any of the following: an alkyl halide (alkyl group: C1 to C18, halogen atom: chlorine atom, bromine atom or iodine atom); a halogenated benzyl such as benzyl chloride or benzyl bromide; an ester of an alkylsulfonic acid (alkyl group: C1 to C18) such as methanesulfonic acid; an alkyl ester of an arylsulfonic acid such as benzene sulfonic acid or toluenesulfonic acid (alkyl group: C1 to C18); or a dialkyl sulfate (alkyl group: C1 to C4). Examples of cationic vinyl monomers further include dialkyldiallylammonium salts.

Block Polymer

The types of the monomers forming a block polymer having a pigment-adsorptive group are not particularly limited. For example, the above monomers for use in the formation of a linear polymer may be used to form various block polymers, and the thus-obtained block polymers may be used. Examples of preferable block polymers include block polymers formed by at least one pigment-adsorptive block, at least one block having an alkali-soluble group and at least one block that does not adsorb on a pigment, and a block polymer formed by at least one pigment-adsorptive block and at least one block having an alkali-soluble group.

Conventionally known methods may be used as methods for obtaining a block polymer. For example, living polymerization, an iniferter method and the like are known. Another method is known in which: polymerization is performed by allowing a thiolcarboxylic acid or a compound containing a thioester and a thiol group in a molecule thereof, such as 2-acetylthioethyl ether or 10-acetylthiodecane thiol, to coexist when radical-polymerizing a monomer having a pigment-adsorptive group or a monomer not having a pigment-adsorptive group, so as to obtain a polymer; the obtained polymer is treated with an alkali such as sodium hydroxide or ammonia so as to obtain a polymer having a thiol group at one terminal thereof; and radical-polymerizing the monomer component of the other block in the presence of the obtained polymer having a thiol group at one terminal thereof. Of these methods, living polymerization is preferable.

Graft Polymer

Preferable examples of graft polymers having a pigment-adsorptive functional group are not particularly limited, and include a graft polymer formed using a polymerizable oligomer (hereinafter referred to as "macromonomer") as a copolymerization component, as described in JP-A No. 9-171253 and "*Macromonomer-no-Kagaku-to-Kogyo* (Chemistry and Industries of Macromonomers)" (Industrial Publishing & Consulting, Inc., 1989).

Preferable examples of branch portions of the graft polymer include polystyrene, polyethylene oxide, polypropylene oxide, poly(meth)acrylic esters and polycaprolactone, and graft polymers having at least a structural unit represented by Formula (V) at a branch portion are more preferable.

Formula (V)

In Formula (V), $R^{74}$ represents a hydrogen atom or an alkyl group having from 1 to 8 carbon atoms, and $Q'$ represents a cyano group, an aryl group having from 6 to 30 carbon atoms, or —$COOR^{75}$ ($R^{75}$ representing a hydrogen atom, an alkyl group having from 1 to 22 carbon atoms or an aryl group having from 6 to 30 carbon atoms).

In Formula (V), the alkyl group represented by $R^{74}$ may have a substituent. The alkyl group represented by $R^{74}$ is preferably an alkyl group having from 1 to 6 carbon atoms, and particularly preferably a methyl group. Examples of the substituent on the alkyl group include a halogen atom, a carboxyl group, an alkoxycarbonyl group and an alkoxy group. Specific examples of the alkyl group include a methyl group, an ethyl group, a hexyl group, an octyl group, a trifluoromethyl group, a carboxymethyl group and a methoxycarbonylmethyl group.

Of these examples of $R^{74}$, a hydrogen atom and a methyl group are preferable.

In Formula (V), the aryl group represented by $Q'$ may have a substituent. The aryl group represented by $Q'$ is preferably an aryl group having from 6 to 20 carbon atoms, and particularly preferably an aryl group having from 6 to 12 carbon atoms. Examples of the substituent on the aryl group include a halogen atom, an alkyl group, an alkoxy group and an alkoxycarbonyl group. Specific examples of the aryl group include a phenyl group, a naphthyl group, a tolyl group, a xylyl group, a propylphenyl group, a butylphenyl group, an octylphenyl group, a dodecylphenyl group, a methoxyphenyl group, an ethoxyphenyl group, a butoxyphenyl group, a decyloxyphenyl group, a chlorophenyl group, a dichlorophenyl group, a bromophenyl group, a methoxycarbonylphenyl group, an ethoxycarbonylphenyl group and a butoxycarbonylphenyl group. Of these aryl groups, an unsubstituted aryl group or an aryl group substituted by a halogen atom, an alkyl group or an alkoxy group is preferable, and an unsubstituted aryl group or an aryl group substituted by an alkyl group is particularly preferable.

The alkyl group represented by $R^{75}$ in —$COOR^{75}$ represented by $Q'$ of Formula (V) may have a substituent, is preferably an alkyl group having from 1 to 12 carbon atoms, and is particularly preferably an alkyl group having from 1 to 8 carbon atoms. Examples of the substituent on the alkyl group include a halogen atom, an alkenyl group, an aryl group, a hydroxyl group, an alkoxy group, an alkoxycarbonyl group, an amino group, an acylamino group and a carbamoyl group. Specific examples of the alkyl group include a methyl group, an ethyl group, a propyl group, a butyl group, a heptyl group, a hexyl group, an octyl group, a decyl group, a dodecyl group, a tridecyl group, a tetradecyl group, a hexadecyl group, an octadecyl group, a 2-chloroethyl group, a 2-bromoethyl group, a 2-methoxycarbonylethyl group, a 2-methoxyethyl group, a 2-bromopropyl group, a 2-butenyl group, a 2-pentenyl group, a 3-methyl-2-pentenyl group, a 2-hexenyl group, a 4-methyl-2-hexenyl group, a benzyl group, a phenethyl group, a 3-phenylpropyl group, a naphthylmethyl group, a 2-naphthylethyl group, a chlorobenzyl group, a bromobenzyl group, a methylbenzyl group, an ethylbenzyl group, a methoxybenzyl group, a dimethylbenzyl group, a dimethoxybenzyl group, a cyclohexyl group, a 2-cyclohexylethyl group, a 2-cyclopentylethyl group, a bicyclo[3.2.1]oct-2-yl group, a 1-adamantyl group, a dimethylaminopropyl group, an acetylaminoethyl group and a N,N-dibutylaminocarbamoylmethyl group. Of these alkyl groups, an unsubstituted alkyl group or an alkyl group substituted by a halogen atom, an aryl group or a hydroxyl group is preferable, and an unsubstituted alkyl group is particularly preferable.

The aryl group represented by $R^{75}$ in —$COOR^{75}$ represented by $Q'$ of Formula (V) may have a substituent, is preferably an aryl group having from 6 to 20 carbon atoms, and is particularly preferably an aryl group having from 6 to 12 carbon atoms. Examples of the substituent on the aryl group include a halogen atom, an alkyl group, an alkenyl group, an alkoxy group, an alkoxycarbonyl group and an acylamino group. Specific examples of the aryl group include a phenyl group, a naphthyl group, a tolyl group, a xylyl group, a propylphenyl group, a butylphenyl group, an octylphenyl group, a dodecylphenyl group, a methoxyphenyl group, an ethoxyphenyl group, a butoxyphenyl group, a decyloxyphenyl group, a chlorophenyl group, a dichlorophenyl group, a bromophenyl group, a methoxycarbonylphenyl group, an ethoxycarbonylphenyl group, a butoxycarbonylphenyl group, an acetoamidophenyl group, a propioamidophenyl group and a dodecyloylamidophenyl group. Of these aryl groups, an unsubstituted aryl group or an aryl group substituted by a halogen atom, an alkyl group or an alkoxy group is preferable, and an aryl group substituted by an alkyl group is particularly preferable.

Of these examples of $R^{75}$, a hydrogen atom or an alkyl group having from 1 to 22 carbon atoms is preferable, and a hydrogen atom or an alkyl group having from 1 to 12 carbon atoms is particularly preferable.

In a graft polymer having at least a structural unit represented by Formula (V) at a branch portion, specific examples of the branch portion include poly(methyl(meth)acrylate), poly(n-butyl(meth)acrylate), poly(i-butyl(meth)acrylate), poly(methyl(meth)acrylate-co-benzyl(meth)acrylate), poly(methyl(meth)acrylate-co-styrene), poly(methyl(meth)acrylate-co-(meth)acrylic acid) and poly(methyl(meth)acrylate-co-acrylonitrile).

Any known method may be used for synthesis of a graft polymer having at least a structural unit represented by Formula (V) at a branch portion.

Specifically, an example of the method is copolymerization of a macromonomer having at least a structural unit represented by Formula (V) and an ethylenic unsaturated monomer capable of copolymerizing with the macromonomer.

Among macromonomers having at least a structural unit represented by Formula (V), those represented by the following Formula (VI) are preferable.

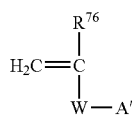

Formula (VI)

In Formula (VI), $R^{76}$ represents a hydrogen atom or an alkyl group having from 1 to 8 carbon atoms; W represents a single bond, or a linking group selected from the following atomic groups or a linking group composed of an arbitrary combination of linking groups selected from the following atomic groups; and A' represents the group having at least a structural unit represented by Formula (V) described above.

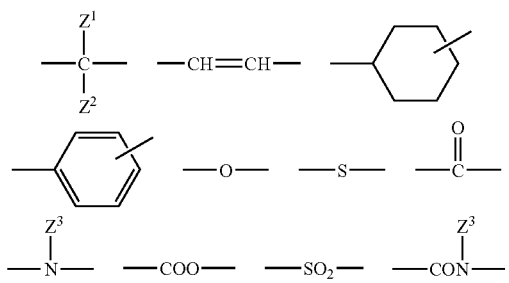

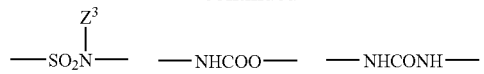

$Z^1$ and $Z^2$ each independently represent a hydrogen atom, a halogen atom, an alkyl group having from 1 to 6 carbon atoms, a cyano group or a hydroxyl group, and $Z^3$ represents a hydrogen atom, an alkyl group having from 1 to 18 carbon atoms or an aryl group having from 6 to 20 carbon atoms.

A' represents the group having at least a structural unit represented by Formula (V) described above.

Specific examples of macromonomers represented by Formula (VI) include those shown below ((m-1) to (m-8)).

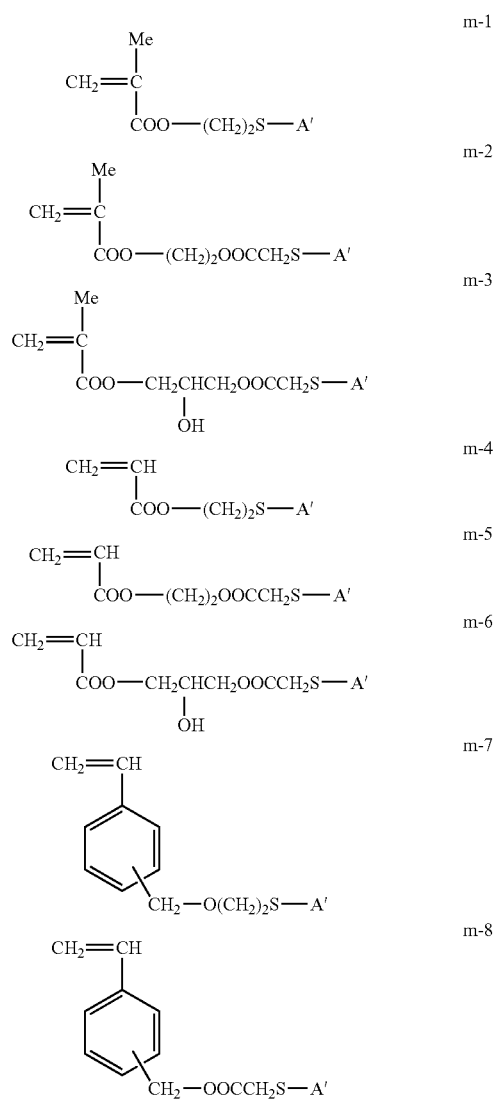

A' in (m-1) to (m-8) above has the same definition as A' in Formula (VI).

Commercially-available examples of the macromonomers include: a poly(methyl methacrylate) oligomer of which one terminal is methacryloylated (number average molecular weight (Mn): 6,000, tradename: AA-6 manufactured by Toagosei Co., Ltd.); a poly(n-butyl acrylate) oligomer of which one terminal is methacryloylated (Mn: 6,000, tradename:

AB-6 manufactured by Toagosei Co., Ltd.) and a polystyrene oligomer of which one terminal is methacryloylated (Mn: 6,000, tradename: AS-6 manufactured by Toagosei Co., Ltd.).

In regard to the molecular weight of the macromonomer, the number average molecular weight (Mn) thereof in terms of polystyrene-equivalent value is preferably from 1,000 to 20,000, and more preferably from 2,000 to 15,000. When the number average molecular weight is in the above range, steric repulsion effects as a pigment dispersant are more effectively obtained.

Examples of ethylenic unsaturated monomers capable of copolymerizing with the macromonomer include the above-described various monomers for use in synthesis of the linear polymer.

Terminal-Modified Polymer

Examples of terminal-modified polymers having a pigment-adsorptive functional group include polymers which have a pigment-adsorptive functional group at a terminal of each polymer and are described in JP-A No. 9-77994, JP-A 2002-273191 and the like.

The method of synthesizing a polymer having a functional group at a polymer terminal is not particularly limited. Examples thereof include the following methods and a method that is a combination of the following methods.

1. A method of synthesizing by polymerization (for example, radical polymerization, anionic polymerization, cationic polymerization or the like) using a polymerization initiator containing a functional group 2. A method of synthesizing by radical polymerization using a chain transfer agent containing a functional group Examples of the functional group to be introduced include the pigment-adsorptive portion (i.e., a portion selected from the organic colorant structure or the heterocyclic structure) described above. The functional group to be introduced may be a functional group that can be derivatized into such an adsorptive portion.

Examples of the chain transfer agent with which a functional group can be introduced to a polymer terminal include: mercapto compounds such as thioglycolic acid, thiomalic acid, thiosalicylic acid, 2-mercaptopropionic acid, 3-mercaptopropionic acid, 3-mercaptobutyric acid, N-(2-mercaptopropionyl)glycine, 2-mercaptonicotinic acid, 3-[N-(2-mercaptoethyl)carbamoyl]propionic acid, 3-[N-(2-mercaptoethyl)amino]propionic acid, N-(3-mercaptopropionyl)alanine, 2-mercaptoethanesulfonic acid, 3-mercaptopropanesulfonic acid, 4-mercaptobutanesulfonic acid, 2-mercaptoethanol, 3-mercapto-1,2-propanediol, 1-mercapto-2-propanol, 3-mercapto-2-butanol, mercaptophenol, 2-mercaptoethylamine, 2-mercaptoimidazole, 2-mercapto-3-pyridinol, benzenethiol, toluenethiol, mercaptoacetophenon, naphthalenethiol and naphthalenemethanethiol); disulfide compounds that are oxidized products of these mercapto compounds; and halogen compounds such as 2-iodoethanesulfonic acid and 3-iodopropanesulfonic acid.

Examples of the polymerization initiator with which a functional group can be introduced at a polymer terminal include 2,2'-azobis(2-cyanopropanol), 2,2'-azobis(2-cyanopentanol), 4,4'-azobis(4-cyanovaleric acid), 4,4'-azobis(4-cyanovaleryl chloride), 2,2'-azobis[2-(5-methyl-2-imidazolin-2-yl)propane], 2,2'-azobis[2-(2-imidazolin-2-yl) propane], 2,2'-azobis[2-(3,4,5,6-tetrahydropyrimidin-2-yl) propane], 2,2'-azobis{2-[1-(2-hydroxyethyl)-2-imidazolin-2-yl]propane} and 2,2'-azobis[2-methyl-N-(2-hydroxyethyl)-propionamide], and derivatives thereof.

For the polymerization, the above-described monomers for use in synthesis of the linear polymer may be used.

The graft polymers and the terminal-modified polymers are preferable as the (C) polymer compound having a pigment-adsorptive functional group used in the invention. In particular, graft polymers that contain a copolymerization unit derived from a monomer having an organic colorant structure or a heterocyclic structure, and terminal-modified polymers having an organic colorant structure or a heterocyclic structure as a terminal group are particularly preferable.

The weight average molecular weight of the polymer compound having a pigment-adsorptive functional group is preferably 5,000 or more, and more preferably from 10,000 to 300,000, with a view to achieving a viscosity range that is convenient for use in processes, such as applying a color resist, and ensuring film strength. The number average molecular weight of the polymer compound having a pigment-adsorptive functional group is preferably 1,000 or more, and more preferably from 2,000 to 250,000.

The polydispersity (weight average molecular weight/ number average molecular weight) of the polymer compound having a pigment-adsorptive functional group is preferably 1 or higher, and more preferably in the range of from 1.1 to 10.

The polymer compound having a pigment-adsorptive functional group is preferably a polymer having a high acid value, from the viewpoint of favorable of developability. However, an excessively high acid value may narrow the proper development range (development latitude) due to excessively high solubility in alkali. Therefore, the acid value of the polymer is preferably in the range of from 20 to 300 (mg KOH/g polymer), more preferably in the range of from 30 to 250 (mg KOH/g polymer), and further preferably in the range of from 35 to 200 (mg KOH/g polymer).

The (C) polymer compound having a pigment-adsorptive functional group usable in the invention can be synthesized according to a conventionally known method. Examples of a solvent that can be used in the synthesis include tetrahydrofuran, ethylene dichloride, cyclohexanone, methyl ethyl ketone, acetone, methanol, ethanol, ethylene glycol monomethyl ether, ethylene glycol monoethyl ether, 2-methoxyethyl acetate, diethylene glycol dimethyl ether, 1-methoxy-2-propanol, 1-methoxy-2-propyl acetate, N,N-dimethylformamide, N,N-dimethylacetamide, toluene, ethyl acetate, methyl lactate, ethyl lactate, dimethyl sulfoxide and water. These solvents may be used singly, or two or more thereof may be mixed and used.

Examples of a radical polymerization initiator that can be used when synthesizing the (C) polymer compound having a pigment-adsorptive functional group include known compounds such as azo initiators and peroxide initiators.

The content of (C) polymer compound having a pigment-adsorptive functional group in the pigment dispersion composition of the invention is preferably from 0.1 to 50% by mass, more preferably from 0.5 to 40% by mass, and still more preferably from 1 to 30% by mass, relative to the total mass of the composition. A content within the above range is preferable because, with such a content, the dispersibility and dispersion stability of the pigment are high, and hue is not impaired.

In the pigment dispersion composition of the invention, the (C) polymer compound having a pigment-adsorptive functional group may be used singly, or in combination of two or more thereof.

Dispersant

In addition to the (C) specific polymer dispersant, other known pigment dispersants (dispersants not having a pigment-adsorptive functional group) and/or surfactants may be suitably selected and incorporated into the pigment dispersion composition of the invention for the purpose of improving dispersibility and dispersion stability, as long as the effects of the invention are not impaired.

Specifically, many types of compound may be used. Examples thereof include: cationic surfactants such as an organosiloxane polymer (tradename: KP341 manufactured by Shin-Etsu Chemical Co., Ltd.) and (meth)acrylic (co) polymers (tradenames: POLYFLOW No. 75, No. 90 and No. 95 manufactured by KYOEISHA CHEMICAL Co., Ltd.) and W001 (tradename, manufactured by Yusho Co., Ltd.); non-ionic surfactants such as polyoxyethylene lauryl ether, polyoxyethylene stearyl ether, polyoxyethylene oleyl ether, polyoxyethylene octyl phenyl ether, polyoxyethylene nonyl phenyl ether, polyethyleneglycol dilaurate, polyethyleneglycol distearate and sorbitan fatty acid ester; anionic surfactants such as W004, W005 and W017 (all of which are tradenames, manufactured by Yusho Co., Ltd.); polymer dispersants such as EFKA-46, EFKA-47, EFKA-47EA, EFKA POLYMER 100, EFKA POLYMER 400, EFKA POLYMER 401 and EFKA POLYMER 450 (all of which are tradenames, manufactured by Ciba Specialty Chemicals Inc.) and DISPERSE AID 6, DISPERSE AID 8, DISPERSE AID15 and DISPERSE AID 9100 (all of which are trade names, manufactured by SAN NOPCO LIMITED); various SOLSPERSE dispersants such as SOLSPERSE 3000, 5000, 9000, 12000, 13240, 13940, 17000, 24000, 26000 and 28000 (all of which are tradenames, manufactured by Lubrizol Japan Ltd.); and ADEKA PLURONIC L31, F38, L42, L44, L61, L64 F68, L72, P95, F77, P84, F87, P94, L101, P103, F108, L121 and P-123 (all of which are tradenames, manufactured by ADEKA Corporation), IONET S-20 (tradename, manufactured by Sanyou Chemical Industries Co., Ltd.) and DISPERBYK 101, 103, 106, 108, 109, 111, 112, 116, 130, 140, 142, 162, 163, 164, 166, 167, 170, 171, 174, 176, 180, 182, 2000, 2001, 2050 and 2150 (all of which are tradenames, manufactured by BYK Japan KK). Further examples include an oligomer or polymer having a polar group at a molecular terminal or at a side chain, such as an acrylic copolymer.

The content of other dispersants in the pigment dispersion composition is preferably from 0 to 100 parts by mass, and more preferably from 3 to 70 parts by mass, relative to 100 parts by mass of pigments (total amount) including the (A) organic pigment.

Preparation of Pigment Dispersion Composition

The method of preparing a pigment dispersion composition containing the (A) to (C) above and optional components may be, for example, a method in which a dispersion obtained by mixing the (A) organic pigment and the (C) specific polymer dispersant in advance and dispersing the mixture with a homogenizer or the like is finely-dispersed by using a bead disperser using a zirconia beads or the like (for example, tradename: DISPERMAT manufactured by GETZMANN Gmbh). The dispersion time is preferably from 1 hour to 12 hours. The (B) specific pigment derivative can be added at any stage in the preparation of a pigment dispersion liquid. It is preferable to add the (B) specific pigment derivative at a process of obtaining a finer pigment and/or at the time of fine-dispersing.

The pigment dispersion composition of the invention thus obtained is excellent in dispersibility and dispersion stability of the pigment even when a fine organic pigment is used. Therefore, not only can the pigment dispersion composition be applied to the curable color composition described below, but the pigment dispersion composition is also suitable for use in various fields in which uniform pigment dispersions are required, such as paints and inkjet inks.

Curable Color Composition

The curable color composition of the invention is prepared by mixing the pigment dispersion composition of the invention, (D) a polymerizable compound, (E) a photopolymerization initiator and other components. The curable color composition preferably further includes (F) an alkali-soluble resin.

The amount of the pigment dispersion composition of the invention contained in the curable color composition of the invention is preferably in the range of from 5 to 90% by mass, and more preferably in the range of from 25 to 85% by mass.

As a result of including the pigment dispersion composition at the above blend amount, the amount of (A) organic pigment contained in the curable color composition of the invention preferably becomes to be in the range of from 15 to 60% by mass relative to the solids, and a color region (cured color layer) capable of exhibiting a sufficient hue even with a small layer thickness can be formed.

In the following, components of the curable color composition of the invention, other than the pigment dispersion composition, are described in detail.

(D) Polymerizable Compound

As a polymerizable compound that can be used in the curable color composition of the invention, compounds that have at least one addition-polymerizable ethylenic unsaturated group and have a boiling point of 100° C. or higher at normal pressure are preferable, among which tetra- or higher-functional acrylate compounds are more preferable.

Examples of the compounds that have at least one addition-polymerizable ethylenic unsaturated group and have a boiling point of 100° C. or higher at normal pressure include: monofunctional acrylates or methacrylates, such as polyethyleneglycol mono(meth)acrylate, polypropyleneglycol mono(meth)acrylate and phenoxyethyl(meth)acrylate; and polyfunctional acrylates or methacrylates such as polyethyleneglycol di(meth)acrylate, trimethylolethane tri(meth)acrylate, neopentylglycol di(meth)acrylate, pentaerythritol tri(meth)acrylate, pentaerythritol tetra(meth)acrylate, dipentaerythritol hexa(meth)acrylate, hexanediol (meth) acrylate, trimethylolpropane tri(acryloyloxypropyl)ether, tri (acryloyloxyethyl)isocyanurate, compounds in which ethylene oxide or propylene oxide is added to polyfunctional alcohols such as glycerin or trimethylolethane and then (meth)acrylated, poly(meth)acrylated pentaerythritol or poly (meth)acrylated dipentaerythritol, urethane acrylates described in JP-B Nos. 48-41708 and 50-6034 and JP-A No. 51-37193, polyester acrylates described in JP-A No. 48-64183 and JP-B Nos. 49-43191 and 52-30490 and epoxy acrylates as reaction products of epoxy resins and (meth) acrylic acid.

Photocurable monomers and oligomers described in *Nihon Secchaku Kyoukaishi* (Journal of the Adhesion Society of Japan), Vol. 20, No. 7, pp. 300 to 308 are also usable.

The compounds in which ethylene oxide or propylene oxide is added to polyfunctional alcohols and then (meth) acrylated, and which are described as Formulas (1) and (2) together with specific examples thereof in JP-A No. 10-62986, are also usable.

In particular, dipentaerythritol penta(meth)acrylate, dipentaerythritol hexa(meth)acrylate and structures in which acryloyl groups of either of these compounds are linked to the dipentaerythritol via ethylene glycol or propylene glycol residues, are preferable. Oligomers thereof are also usable.

Also preferred are urethane acrylates such as those described in JP-B No. 48-41708, JP-A No. 51-37193, JP-B No. 2-32293 and JP-B No. 2-16765, and urethane compounds having ethyleneoxide skeleton and described in JP-B Nos.

58-49860, 56-17654, 62-39417 and 62-39418. Photopolymerizable compositions having excellent photoresponsive speed can also be obtained using addition-polymerizable compounds having an amino or sulfide structure in a molecule thereof, which are disclosed in JP-A Nos. 63-277653, 63-260909 and 01-105238. Commercially available products thereof include: urethane oligomers UAS-10 and UAB-140 (both of which are tradenames, manufactured by Sanyo-Kokusaku pulp Co., Ltd.); UA-7200 (tradename, manufactured by Shin-Nakamura Chemical Co., Ltd.); DPHA-40H (tradename, manufactured by Nippon Kayaku Co., Ltd.); and UA-306H, UA-306T, UA-306I, AH-600, T-600 and AI-600 (all of which are tradenames, manufactured by Kyoei Co., Ltd.).

Ethylenic unsaturated compounds having an acid group are also preferably used, and commercially-available products thereof include TO-756 (tradename, manufactured by Toagosei Co., Ltd.), which is a trifunctional acrylate containing a carboxyl group, and TO-1382 (tradename, manufactured by Toagosei Co., Ltd.), which is a pentafunctional acrylate containing a carboxyl group.

In the curable color composition of the invention, the (D) polymerizable compound may be used singly, or in combination of two or more thereof.

The content of (D) polymerizable compound in the curable color composition is preferably from 20 parts to 200 parts, and more preferably from 50 parts to 120 parts, relative to 100 parts by mass of the total solids of the composition. When the content of polymerizable compound is within the above range, curing reaction can proceed sufficiently.

(E) Photopolymerization Initiator

The polymerization initiator used in the curable color composition of the invention is not particularly limited as long as it is capable of generating an initiating species by decomposition caused by application of energy such as radiation, photo-irradiation or heating. Favorable examples thereof include known photopolymerization initiators.

Examples of photopolymerization initiators include: the halomethyl oxadiazoles described in JP-A No. 57-6096; active halogen compounds such as halomethyl-s-triazines such as those described in JP-B No. 59-1281 and JP-A No. 53-133428; aromatic carbonyl compounds such as the ketals, acetals or benzoin alkyl ethers described in U.S. Pat. No. 4,318,791 and European Patent Application Publication No. 88050; aromatic ketone compounds such as the benzophenones described in U.S. Pat. No. 4,199,420; the (thio)xanthone or acridine compounds described in French Patent of Invention No. 2456741; the coumarin compounds and the biimidazole compounds, including the lophine dimers, described in JP-A No. 10-62986; and sulfonium organic boron complexes such as those described in JP-A No. 8-015521.

Preferable examples of photopolymerization initiators include polymerization initiators of the following types: (1) acetophenone type; (2) ketal type; (3) benzophenone type; (4) benzoin type or benzoyl type; (5) xanthone type; (6) active halogen compound ((6-1): triazine type, (6-2) halomethyloxadiazole type, (6-3) coumarin type); (7) acridine type; (8) biimidazole type; and (9) oxime ester type.

Preferable examples of (1) acetophenone photopolymerization initiators include 2,2-diethoxyacetophenone, p-dimethylaminoacetophenone, 2-hydroxy-2-methyl-1-phenyl-propan-1-one, p-dimethylaminoacetophenone, 4'-isopropyl-2-hydroxy-2-methyl-propiophenone, 1-hydroxy-cyclohexyl-phenyl-ketone, 2-benzyl-2-dimethylamino-1-(4-morpholinophenyl)-butanone-1,2-tolyl-2-dimethylamino-1-(4-morpholinophenyl)-butanone-1, and 2-methyl-1-[4-(methylthio)phenyl]-2-morpholinopropanone-1.

Preferable examples of (2) ketal photopolymerization initiators include benzil dimethyl ketal and benzil-β-methoxyethylacetal.

Preferable examples of (3) benzophenone photopolymerization initiators include benzophenone, 4,4'-(bisdimethylamino)benzophenone, 4,4'-(bisdiethylamino)benzophenone, 4,4'-dichlorobenzophenone, 1-hydroxy-cyclohexyl-phenyl-ketone, 2-benzyl-2-dimethylamino-1-(4-morpholinophenyl)-butanone-1,2-tolyl-2-dimethylamino-1-(4-morpholinophenyl)-butanone-1, and 2-methyl-1-[4-(methylthio)phenyl]-2-morpholinopropanone-1.

Preferable examples of (4) benzoin or benzoyl photopolymerization initiators include benzoin isopropyl ether, benzoin isobutyl ether, benzoin methyl ether and methyl o-benzoyl benzoate.

Preferable examples of (5) xanthone photopolymerization initiators include diethylthioxanthone, diisopropylthioxanthone, monoisopropylthioxanthone and chlorothioxanthone.

Preferable examples of (6-1) triazine photopolymerization initiators as (6) active halogen compounds include 2,4-bis(trichloromethyl)-6-p-methoxyphenyl-s-triazine, 2,4-bis(trichloromethyl)-6-p-methoxystyryl-s-triazine, 2,4-bis(trichloromethyl)-6-(1-p-dimethylaminophenyl)-1,3-butadienyl-s-triazine, 2,4-bis(trichloromethyl)-6-biphenyl-s-triazine, 2,4-bis(trichloromethyl)-6-(p-methylbiphenyl)-s-triazine, p-hydroxyethoxystyryl-2,6-di(trichloromethyl)-s-triazine, methoxystyryl-2,6-di(trichloromethyl)-s-triazine, 3,4-dimethoxystyryl-2,6-di(trichloromethyl)-s-triazine, 4-benzoxolan-2,6-di(trichloromethyl)-s-triazine, 4-(o-bromo-p-N,N-(diethoxycarbonylamino)-phenyl)-2,6-di(chloromethyl)-s-triazine and 4-(p-N,N-(diethoxycarbonylamino)-phenyl)-2,6-di(chloromethyl)-s-triazine.

Preferable examples of (6-2) halomethyloxadiazole photopolymerization initiators include 2-trichloromethyl-5-styryl-1,3,4-oxadiazole, 2-trichloromethyl-5-(cyanostyryl)-1,3,4-oxadiazole, 2-trichloromethyl-5-(naphth-1-yl)-1,3,4-oxadiazole and 2-trichloromethyl-5-(4-styryl)styryl-1,3,4-oxadiazole.

Preferable examples of (6-3) coumarin photopolymerization initiators include 3-methyl-5-amino((s-triazin-2-yl)amino)-3-phenylcoumarin, 3-chloro-5-diethylamino-((s-triazin-2-yl)amino)-3-phenylcoumarin and 3-butyl-5-dimethylamino-((s-triazin-2-yl)amino)-3-phenylcoumarin.

Preferable examples of (7) acridine photopolymerization initiators include 9-phenylacridine and 1,7-bis(9-acrydinyl)heptane.

Preferable examples of (8) biimidazole photopolymerization initiators include: lophine dimers such as 2-(o-chlorophenyl)-4,5-diphenylimidazolyl dimer, 2-(o-methoxyphenyl)-4,5-diphenylimidazolyl dimer and 2-(2,4-dimethoxyphenyl)-4,5-diphenylimidazolyl dimer; 2-mercaptobenzimidazole; and 2,2'-benzothiazolyl disulfide.

Further examples include 1-phenyl-1,2-propanedione-2-(o-ethoxycarbonyl)oxime, o-benzoyl-4'-(benzmercapto)benzoyl-hexyl-ketoxime, 2,4,6-trimethylphenylcarbonyl-diphenylphosphonyl oxide and a hexafluorophosphorotrialkylphenyl phosphonium salt.

In the invention, photopolymerization initiators are not limited to the above, and other known photopolymerization initiators may be used. Examples thereof include: vicinal polyketolaldonyl compounds described in U.S. Pat. No. 2,367,660; α-carbonyl compounds described in U.S. Pat. Nos. 2,367,661 and 2,367,670; acyloin ethers described in U.S. Pat. No. 2,448,828; aromatic acyloin compounds substituted by an α-hydrocarbon described in U.S. Pat. No.

2,722,512; polynuclear quinone compounds described in U.S. Pat. Nos. 3,046,127 and 2,951,758; a combination of a triallylimidazole dimer/p-aminophenyl ketone described in U.S. Pat. No. 3,549,367; benzothiazole compounds/trihalomethyl-s-triazine compounds described in JP-B No. 51-48516; and oxime ester compounds described in J.C.S. Perkin II (1979) 1653-1660, J.C.S. Perkin II (1979)156-162, Journal of Photopolymer Science and Technology (1995) 202-232 and JP-A No. 2000-66385.

Plural photoinitiators selected from the above may be used together.

The content of (E) photopolymerization initiator in the curable color composition of the invention is preferably from 0.1 to 10.0% by mass, and more preferably from 0.5 to 5.0% by mass, relative to the total solids of the composition. When the content of photopolymerization initiator is within the above range, a film having excellent strength can be formed due to favorable progress of polymerization reaction.

Solvent

The pigment dispersion composition and curable color composition of the invention are generally prepared preferably using a solvent with the above components.

Examples of solvents include: esters such as ethyl acetate, n-butyl acetate, isobutyl acetate, amyl formate, isoamyl acetate, isobutyl acetate, butyl propionate, isopropyl butyrate, ethyl butyrate, butyl butyrate, alkyl esters, methyl lactate, ethyl lactate, methyl oxyacetate, ethyl oxyacetate, butyl oxyacetate, methyl methoxyacetate, ethyl methoxyacetate, butyl methoxyacetate, methyl ethoxyacetate, ethyl ethoxyacetate, alkyl 3-oxypropionates such as methyl 3-oxypropionate and ethyl 3-oxypropionate, methyl 3-methoxypropionate, ethyl 3-methoxypropionate, methyl 3-ethoxypropionate, ethyl 3-ethoxypropionate, methyl 2-oxypropionate, ethyl 2-oxypropionate, propyl 2-oxypropionate, methyl 2-methoxypropionate, ethyl 2-methoxypropionate, propyl 2-methoxypropionate, methyl 2-ethoxypropionate, ethyl 2-ethoxypropionate, methyl 2-oxy-2-methylpropionate, ethyl 2-oxy-2-methylpropionate, methyl 2-methoxy-2-methylpropionate, ethyl 2-ethoxy-2-methylpropionate, methyl pyruvate, ethyl pyruvate, propyl pyruvate, methyl acetoacetate, ethyl acetoacetate, methyl 2-oxobutanoate and ethyl 2-oxobutanoate;

ethers such as diethyleneglycol dimethyl ether, tetrahydrofuran, ethylene glycol monomethyl ether, ethylene glycol monoethyl ether, methyl cellosolve acetate, ethyl cellosolve acetate, diethyleneglycol monomethyl ether, diethyleneglycol monoethyl ether, diethyleneglycol monobutyl ether, propylene glycol methyl ether acetate, propylene glycol ethyl ether acetate and propylene glycol propyl ether acetate;

ketones such as methyl ethyl ketone, cyclohexanone, 2-heptanone and 3-heptanone; and aromatic hydrocarbons such as toluene and xylene.

Of these, methyl 3-ethoxypropionate, ethyl 3-ethoxypropionate, ethyl cellosolve acetate, ethyl lactate, diethyleneglycol dimethyl ether, butyl acetate, methyl 3-methoxypropionate, 2-heptanone, cyclohexanone, ethyl carbitol acetate, butyl carbitol acetate and propylene glycol methyl ether acetate are preferable.

These solvents may be used singly, or in combination of two or more thereof.

In addition to the pigment dispersion composition and the (D) and (E) components, various additives may be incorporated into the curable color composition of the invention depending on the purpose, in a range in which the effects of the invention are not impaired.

In the following, optional components that may be contained in the curable color composition of the invention are described.

(F) Alkali-Soluble Resin

An alkali-soluble resin may be incorporated into the curable color composition of the invention from the viewpoint of improving film properties and developability. The alkali-soluble resin that can be used in the invention may be selected suitably from alkali-soluble resins each of which is a liner organic high-molecular polymer and each of which has at least one alkali-solubility enhancing group (such as a carboxyl group, a phosphoric acid group or a sulfonic acid group) in a molecule thereof (preferably a molecule of which main chain is an acrylic copolymer and/or a styrenic copolymer). Of these, resins which are soluble in an organic solvent and capable of development with a weakly-alkaline aqueous solution are more preferable.

For production of an alkali-soluble resin, for example, a method involving a known radical polymerization method may be applied. When producing an alkali-soluble resin according to a radical polymerization method, polymerization conditions such as the temperature, the pressure, the type and amount of radical initiator and the type of solvent can be easily set by a person skilled in the art, and can be determined experimentally.

The linear organic high-molecular polymer is preferably a polymer having carboxylic acid at a side chain thereof. Examples thereof include methacrylic acid copolymers, acrylic acid copolymers, itaconic acid copolymers, crotonic acid copolymers, maleic acid copolymers and partially-esterified maleic acid copolymers such as those described in JP-A No. 59-44615, JP-B No. 54-34327, JP-B No. 58-12577, JP-B No. 54-25957, JP-A No. 59-53836 and JP-A No. 59-71048; acidic cellulose derivatives having carboxylic acid at a side chain thereof; and products obtained by addition of an acid anhydride to polymers having a hydroxyl group. Preferable examples also include high-molecular polymers having a (meth)acryloyl group at a side chain thereof.

Of these, benzyl(meth)acrylate/(meth)acrylic acid copolymers and multicomponent copolymers composed of benzyl (meth)acrylate/(meth)acrylic acid/other monomer(s) are preferable.

Further, copolymers obtained by copolymerization using 2-hydroxyethyl methacrylate are also preferable examples. The polymers may be mixed in arbitrary amounts and used.

Further examples include a 2-hydroxypropyl(meth)acrylate/polystyrene macromonomer/benzyl methacrylate/methacrylic acid copolymer, a 2-hydroxy-3-phenoxypropyl acrylate/poly(methyl methacrylate) macromonomer/benzyl methacrylate/methacrylic acid copolymer, a 2-hydroxyethyl methacrylate/polystyrene macromonomer/methyl methacrylate/methacrylic acid copolymer and a 2-hydroxyethyl methacrylate/polystyrene macromonomer/benzyl methacrylate/methacrylic acid copolymer, which are described in JP-A No. 7-140654.

In regard to the specific structural units of the alkali-soluble resin, a copolymer of (meth)acrylic acid and other monomer(s) copolymerizable therewith is preferable. Here, "(meth)acrylic acid" is a generic term encompassing acrylic acid and methacrylic acid, and "(meth)acrylate" is a generic term encompassing acrylate and methacrylate; the same applies hereinafter.

Examples of the above-mentioned other monomers copolymerizable with (meth)acrylic acid include alkyl(meth)acrylates, aryl(meth)acrylates and vinyl compounds. Here, hydrogen atoms of the alkyl groups and hydrogen atoms of the aryl groups may be replaced by a substituent.

Specific examples of the alkyl(meth)acrylates and the aryl (meth)acrylates include methyl(meth)acrylate, ethyl(meth)acrylate, propyl(meth)acrylate, butyl(meth)acrylate, isobutyl(meth)acrylate, pentyl(meth)acrylate, hexyl(meth)acrylate, octyl(meth)acrylate, phenyl(meth)acrylate, benzyl(meth)acrylate, tolyl(meth)acrylate, naphthyl(meth)acrylate and cyclohexyl(meth)acrylate.

Examples of the vinyl compounds include styrene, α-methylstyrene, vinyltoluene, glycidyl methacrylate, acrylonitrile, vinyl acetate, N-vinylpyrrolidone, tetrahydrofurfuryl methacrylate, polystyrene macromonomer, poly(methyl methacrylate) macromonomer, $CH_2=CR^1R^2$ and $CH_2=C(R^1)(COOR^3)$, wherein $R^1$ represents a hydrogen atom or an alkyl group having from 1 to 5 carbon atoms, $R^2$ represents an aromatic hydrocarbon ring having from 6 to 10 carbon atoms and $R^3$ represents an alkyl group having from 1 to 8 carbon atoms or an aralkyl group having from 6 to 12 carbon atoms.

The above-described other copolymerizable monomers may be used singly, or in combination of two or more thereof. The other copolymerizable monomer or monomers are preferably at least one selected from $CH_2=CR^1R^2$, $CH_2=C(R^1)(COOR^3)$, phenyl(meth)acrylate, benzyl(meth)acrylate and styrene, and are particularly preferably $CH_2=CR^1R^2$ and/or $CH_2=C(R^1)(COOR^3)$.

The content of (F) alkali-soluble resin in the curable color composition is preferably from 1 to 15% by mass, more preferably from 2 to 12% by mass, and particularly preferably from 3 to 10% by mass, relative to the total solids of the composition.

Other Components

The curable color composition of the invention may include various additives as necessary, such as fluorine-containing organic compounds, thermal polymerization initiators, thermally-polymerizable components, thermal polymerization inhibitors, colorants, photopolymerization initiators, other fillers, polymer compounds other than the (F) alkali-soluble resin, surfactants, adhesion improvers, antioxidants, UV absorbers and aggregation inhibitors.

Fluorine-Containing Organic Compound

When the curable color composition includes a fluorine-containing organic compound, liquid properties (particularly, fluidity) of a coating liquid formed therefrom can be improved, and coating thickness uniformity and liquid-saving properties can be improved. In other words, inclusion of a fluorine-containing organic compound decreases the surface tension between a substrate and the coating liquid, thereby improving the wettability on the substrate and the coating properties on the substrate; thus, a film having uniform thickness with reduced thickness unevenness can be formed even when forming a thin film of about a few μm with a small liquid amount. Therefore, inclusion of a fluorine-containing organic compound is effective.

The fluorine content of the fluorine-containing organic compound is preferably from 3 to 40% by mass, more preferably from 5 to 30% by mass, and particularly preferably from 7 to 25% by mass. A fluorine content within the above range is effective in terms of coating thickness uniformity and liquid-saving properties, and provides favorable solubility in the composition.

Compounds having a fluoroalkyl or fluoroalkylene group at least one of a terminal, the main chain or a side chain may preferably be used as fluorine-containing surfactants. Examples of specific commercially-available products include: MEGAFAC F142D, MEGAFAC F172, MEGAFAC F173, MEGAFAC F176, MEGAFAC F177, MEGAFAC F183, MEGAFAC 780, MEGAFAC 781, MEGAFAC $R^{30}$, MEGAFAC R08, MEGAFAC F-472SF, MEGAFAC BL20, MEGAFAC R-61 and MEGAFAC R-90 (all of which are tradenames, manufactured by DIC Corporation); FLUORAD FC-135, FLUORAD FC-170C, FLUORAD FC-430, FLUORAD FC-431 and NOVEC FC-4430 (all of which are tradenames, manufactured by Sumitomo 3M Ltd.); ASAHI GUARD AG7105, 7000, 950 and 7600, and SURFLON S-112, SURFLON S-113, SURFLON S-131, SURFLON S-141, SURFLON S-145, SURFLON S-382, SURFLON SC-101, SURFLON SC-102, SURFLON SC-103, SURFLON SC-104, SURFLON SC-105 and SC-106 (all of which are tradenames, manufactured by Asahi Glass Co., Ltd.); and EFTOP EF351, EFTOP EF352, EFTOP EF801 and EFTOP EF802 (all of which are tradenames, manufactured by JEMCO Inc.).

Fluorine-containing organic compounds are effective particularly in prevention of coating unevenness or thickness unevenness when the coating film thickness is reduced. Fluorine-containing organic compounds are effective also in slit coating, in which liquid supply shortage easily occurs.

The amount of fluorine-containing organic compound added is preferably from 0.001 to 2.0% by mass, and more preferably from 0.005 to 1.0% by mass, relative to the total mass of the curable color composition.

Thermal Polymerization Initiator

It is effective that the pigment dispersion composition of the invention includes a thermal polymerization initiator. Examples of the thermal polymerization initiator include various azo compounds and peroxide compounds. Examples of the azo compounds include azobis compounds. Examples of the peroxide compounds include ketone peroxides, peroxyketals, hydroperoxides, dialkylperoxides, diacylperoxides, peroxyesters and peroxydicarbonates.

Thermally-Polymerizable Component

It is effective that the pigment dispersion composition of the invention includes a thermally-polymerizable component. If necessary, an epoxy compound may be added in order to increase the strength of a coating film formed from the pigment dispersion composition. Examples of the epoxy compound include compounds having two or more epoxy rings in a molecule thereof, such as epoxy compounds of bisphenol A-type, cresol novolac-type or biphenyl-type or alicyclic epoxy compounds. Examples of epoxy compounds of bisphenol A-type include: EPOTOHTO YD-115, YD-118T, YD-127, YD-128, YD-134, YD-8125, YD-7011R, ZX-1059, YDF-8170 and YDF-170 (all of which are tradenames, manufactured by Tohto Kasei Co., Ltd.); DENACOL EX-1101, EX-1102 and EX-1103 (all of which are tradenames, manufactured by Nagase Chemtex Corporation); PLACCEL GL-61, GL-62, G101 and G102 (all of which are tradenames, manufactured by Daicel Chemical Industries Ltd.); and epoxy compounds of bisphenol F-type and bisphenol S-type that are similar to the above bisphenol A-type epoxy compounds. Epoxy acrylates such as EBECRYL 3700, 3701 and 600 (all of which are tradenames, manufactured by Daicel UCB Company Ltd.) are also usable. Examples of cresol novolac-type epoxy compounds include EPOTOHTO YDPN-638, YDPN-701, YDPN-702, YDPN-703 and YDPN-704 (all of which are tradenames, manufactured by Tohto Kasei Co., Ltd.), and DENACOL EM-125 (tradename, manufactured by Nagase Chemtex Corporation). Examples of biphenyl-type epoxy compounds include 3,5,3',5'-tetramethyl-4,4'-diglycidylbiphenyl. Examples of alicyclic epoxy compounds include: CELLOXIDE 2021, 2081, 2083 and 2085; EPOLEAD GT-301, GT-302, GT-401, GT-403 and EHPE-3150 (all of which are tradenames, manufactured by Daicel Chemical Industries Ltd.); and SUN TOHTO ST-3000, ST-4000, ST-5080 and ST-5100 (all of which are tradenames, manufactured by Tohto kasei Co., Ltd.). Further examples of usable epoxy compounds include: 1,1,2,2-tetrakis(p-glycidyloxyphenyl)ethane; tris(p-glycidyloxyphenyl)methane; triglycidyl tris(hydroxyethyl) isocyanurate; o-pthalic acid diglycidyl ester; terephthalic acid diglycidyl ester; EPOTOHTO YH-434 and YH-434L (both of which are tradenames, manufactured by Tohto Kasei Co., Ltd.), which are amine-type epoxy resins; and glycidyl esters in which a bisphenol A-type epoxy resin has modification by a dimer acid within a skeleton thereof.

Surfactant

The pigment dispersion composition of the invention preferably includes any of various surfactants from the viewpoint of improving coating properties. Other than the fluorine-containing surfactants described above, various surfactants—nonionic, cationic and anionic surfactants—can be used. Of these, the fluorine-containing surfactants described above and nonionic surfactants are preferably used.

Preferable examples of nonionic surfactants include nonionic surfactants such as polyoxyethylene alkyl ethers, polyoxyethylene alkyl aryl ethers, polyoxyethylene alkyl esters, sorbitan alkyl esters and monoglyceride alkyl esters. Specific examples of nonionic surfactants include: polyoxyethylene alkyl ethers such as polyoxyethylene lauryl ether, polyoxyethylene stearyl ether and polyoxyethylene oleyl ether; polyoxyethylene aryl ethers such as polyoxyethylene octylphenyl ether, polyoxyethylene polystyrylated ether, polyoxyethylene tribenzylphenyl ether, polyoxyethylene-propylene polystyryl ether and polyoxyethylene nonylphenyl ether; and polyoxyethylene dialkyl esters such as polyoxyethylene dilaurate and polyoxyethylene distearate, sorbitan fatty acid esters, polyoxyethylene sorbitan fatty acid esters and ethylenediamine polyoxyethylene-polyoxypropylene condensates. Commercially-available products of these nonionic surfactants, which are available from Kao Corporation, NOF Corporation, Takemoto Oil & Fat Co., Ltd., ADEKA Corporation, Sanyou Chemical Industries Co., Ltd. and the like, may be suitably used. Aside from the above, the dispersants described above are also usable.

Apart from the above, any of various additives may be incorporated into the curable color composition of the invention. Specific examples of the additives include: UV absorbers such as 2-(3-t-butyl-5-methyl-2-hydroxyphenyl)-5-chlorobenzotriazole and alkoxybenzophenone; aggregation inhibitors such as sodium polyacrylate; fillers such as glass and alumina; and alkali-soluble resins such as itaconic acid copolymers, crotonic acid copolymers, maleic acid copolymers, partially-esterified maleic acid copolymers, acidic cellulose derivatives, products obtained by addition of an acid anhydride to a polymer having a hydroxyl group, alcohol-soluble nylon and phenoxy resins formed from bisphenol A and epichlorohydrin.

An organic carboxylic acid, preferably a low-molecular organic carboxylic acid having a molecular weight of 1,000 or less, may be added with a view to increasing the alkali-solubility of uncured portions and further improving the developability of the curable color composition.

Specific examples thereof include aliphatic monocarboxylic acids such as formic acid, acetic acid, propionic acid, butyric acid, valeric acid, pivalic acid, caproic acid, diethylacetic acid, enanthic acid and caprylic acid; aliphatic dicarboxylic acids such as oxalic acid, malonic acid, succinic acid, glutaric acid, adipic acid, pimelic acid, suberic acid, azelaic acid, sebacic acid, brassylic acid, methylmalonic acid, ethylmalonic acid, dimethylmalonic acid, methylsuccinic acid, tetramethylsuccinic acid and citraconic acid; aliphatic tricarboxylic acids such as tricarballylic acid, aconitic acid and camphoronic acid; aromatic monocarboxylic acids such as benzoic acid, toluic acid, cuminic acid, hemellitic acid and mesitylenic acid; aromatic polycarboxylic acids such as phthalic acid, isophthalic acid, terephthalic acid, trimellitic acid, trimesic acid, mellophanic acid and pyromellitic acid; and other carboxylic acids such as phenylacetic acid, hydroatropic acid, hydrocinnamic acid, mandelic acid, phenylsuccinic acid, atropic acid, cinnamic acid, methyl cinnamate, benzyl cinnamate, cinnamylideneacetic acid, coumaric acid and umbellic acid.

Thermal Polymerization Inhibitor

Aside from the above, it is preferable to further add a thermal polymerization inhibitor to the curable color composition of the invention. For example, it is useful to add hydroquinone, p-methoxyphenol, di-t-butyl-p-cresol, pyrogallol, t-butylcatechol, benzoquinone, 4,4'-thiobis(3-methyl-6-t-butylphenol), 2,2'-methylenebis(4-methyl-6-t-butylphenol), 2-mercaptobenzoimidazole, or the like.

The curable color composition of the invention cures at high sensitivity, and has excellent storage stability. The curable color composition of the invention exhibits high adhesiveness to a surface of a hard material, such as a substrate, to which the curable composition is to be applied. Therefore, the curable color composition of the invention can be used favorably in image forming materials such as three-dimensional photo-molding, holography and color filters and in the fields of inks, paints, adhesives, coating agents and the like.

Preparation of Curable Color Composition and Method for Producing Color Filter Using the Same The curable color composition of the invention can be prepared by incorporating (preferably together with a solvent) the (D) polymerizable compound and the (E) photopolymerization initiator and, optionally, the (F) alkali-soluble resin into the pigment dispersion composition of the invention, incorporating thereinto additives such as surfactants as necessary, and conducting a mixing and dispersing process in which mixing and dispersing are performed using any of various mixers and dispersers.

The mixing and dispersing process is preferably composed of kneading dispersion and a fine-dispersing treatment subsequent thereto. However, the kneading dispersion may be omitted.

An example of a method of producing the curable color composition of the invention is described below.

1. Preparation of Finer Pigment

A mixture of pigment(s), water-soluble organic solvent(s) and water-soluble inorganic salt(s) is processed by a kneader such as a two-roll mill, a three-roll mill, a ball mill, a trommel, a disper, a kneader, a cokneader, a homogenizer, a blender or a uniaxial or biaxial kneader, thereby grinding the pigment while applying strong shear force. Thereafter, the resultant mixture is added into water, and is formed into a slurry by using an agitator or the like. Then, the slurry is filtrated and washed with water, thereby removing the water-soluble organic solvent(s) and the water-soluble inorganic salt(s). Thereafter, the resultant is dried, as a result of which a finer pigment is obtained.

2. Preparation of Pigment Dispersion Composition

The (A) organic pigment, the (B) specific pigment derivative, the (C) specific polymer dispersant and solvent(s) are blended and subjected to bead dispersion. The fine-dispersing treatment is conducted using beads that are made of glass, zirconia or the like and that have a particle diameter of from 0.01 mm to 1 mm, and using mainly a vertical or horizontal sand grinder, a pin mill, a slit mill, a ultrasonic disperser or the like; as a result, a pigment dispersion composition is obtained. The process of obtaining a finer pigment can be omitted.

The specifics of the kneading and dispersing are described in T. C. Patton "Paint Flow and Pigment Dispersion" (John Wiley and Sons Inc., 1964) and the like.

3. Preparation of Curable Color Composition

The (D) polymerizable compound and the (E) photopolymerization initiator and optional components such as the (F) alkali-soluble resin are added to the pigment dispersion composition obtained as described above, as a result of which the curable color composition of the invention is obtained.

The color filter of the invention is described in detail below by describing a production method thereof (the method for producing a color filter of the invention).

The method for producing a color filter of the invention includes: a process of forming a curable color composition coating layer by slit-coating the curable color composition of the invention directly on a substrate or on a substrate with at least one other layer disposed therebetween (hereinafter referred to simply as "curable composition layer formation process" in some cases); an exposure process of pattern-exposing the coating layer to light (hereinafter referred to simply as "exposure process" in some cases); and a development process of developing the curable color composition coating layer after the exposure with an alkali developer liquid so as to form a patterned color region (hereinafter referred to simply as "development process" in some cases).

That is, a color filter of the invention is formed on a substrate, such as glass, by using the above-described curable color composition of the invention. The color filter of the invention can be prepared favorably by sequentially performing: forming a coating film from the curable color composition of the invention directly on a substrate or on a substrate with at least one other layer disposed therebetween, by, for example, slit coating; thereafter drying the coating film; optionally prebaking the coating layer formed; pattern-exposing the coating layer to light; and performing a development treatment using a developer liquid. Through these processes, pixels of a predetermined hue are formed, and a patterned color region composed of pixels of respective colors (three colors or four colors) may be formed by repeating similar processes as necessary, as a result of which a color filter is obtained.

Thus, color filters for use in liquid crystal display devices and solid-state imaging devices can be formed with high quality and reduced process-associated difficulty at low costs.

In the following, the respective processes in the production method of the invention are described.

Curable Composition Layer Formation Process

This process is a process of applying the curable color composition of the invention directly on a substrate or on a substrate with at least one other layer disposed therebetween by a coating method such as spin coating, slit coating, cast coating, roll coating or bar coating, thereby forming a photo-curable coating film Examples of the substrate on which the curable color composition is to be coated include: alkali-free glass, soda glass, PYREX (registered trademark) glass, quartz glass and materials obtained by attaching a transparent conductive film to these glasses, which are used in liquid crystal display devices and the like; photoelectric conversion device substrates such as silicon substrates, which are used in solid-state imaging devices; and plastic substrates. Usually, a black matrix that separates the respective pixels is formed on the substrate, and/or a transparent resin layer is formed on the substrate in order to, for example, improve adhesion.

A surface of a plastic substrate is preferably provided with a gas barrier layer and/or a solvent-resistance layer. Other than that, a patterned film formed from the curable color composition of the invention may be formed on a drive substrate, on which thin-film transistors (TFTs) are disposed, of a thin film transistor (TFT)-system color liquid crystal display apparatus (hereinafter referred to as "substrate for TFT-system liquid crystal driving"), so as to form a color filter. The photomask used therefor is provided with a pattern for forming a through hole or a U-shaped depression as well as a pattern for forming pixels. Examples of the substrate of a substrate for TFT-system liquid crystal driving include glass, silicon, polycarbonate, polyester, aromatic polyamide, polyamidoimide and polyimide. The substrate may be a substrate that has been subjected to an appropriate pre-treatment, as desired, such as a treatment with an agent such as a silane coupling agent, a plasma treatment, ion plating, sputtering, a gas-phase reaction method or vacuum deposition. Examples thereof include a substrate obtained by forming a passivation film, such as a silicon nitride film, over a surface of a substrate for TFT-system liquid crystal driving as well as the driving substrate.

In the present process, the expression "directly on a substrate or on a substrate with at least one other layer disposed therebetween" means that the substrate to which the curable color composition is to be coated encompasses substrates having the above various surface layers and/or wires, and surface-treated substrates. The scope of the term "substrate" in the present specification includes the above embodiments.

The method of coating the curable color composition of the invention on a substrate is not particularly limited, and is preferably a method using a slit nozzle (hereinafter referred to as "slit nozzle coating method") such as a slit-and-spin coating method or a spinless coating method. Of the slit nozzle coating methods, the conditions of the slit-and-spin method and the spinless coating method may vary with the size of the substrate on which coating is to be performed. For example, when coating on a fifth-generation glass substrate (1100 mm×1250 mm) by a spinless coating method, the amount of the curable color composition ejected from the slit nozzle is usually from 500 to 2,000 microliters/second, and preferably from 800 to 1,500 microliters/second, and the coating speed is usually from 50 to 300 mm/second, and preferably from 100 to 200 mm/second. The solids content of the curable color composition is usually from 10% to 20%, and preferably from 13% to 18%.

When forming a coating film from the curable color composition of the invention on a substrate, the thickness (after prebaking) of the coating film (curable color composition layer) is generally from 0.3 μm to 5.0 μm, desirably from 0.5 μm to 4.0 μm, and most desirably from 0.8 μm to 3.0 μm.

When applying the curable color composition of the invention to formation of a color filter for a solid-state imaging device having high resolution, the thickness of the film is most preferably from 0.4 μm to 2.0 μm.

A prebaking treatment is usually performed after coating. A vacuum treatment may be performed before prebaking, if necessary. The conditions of the vacuum drying may be such that the degree of vacuum is usually from 0.1 torr to 1.0 torr, and preferably approximately from 0.2 torr to 0.5 torr.

The prebaking treatment may be conducted using a hot plate, oven or the like, at a temperature range of from 50° C. to 140° C., preferably at from 70° C. to 110° C., for from 10 seconds to 300 seconds. A high-frequency treatment or the like may be used in combination with the prebaking treatment. A high-frequency treatment may alternatively be used alone.

Exposure Process

In the exposure process, the curable composition layer formed in the curable composition layer formation process is exposed to light through a mask having a predetermined mask pattern.

In the light exposure in the present process, pattern exposure of the coating film to light can be conducted by exposing to light through a predetermined mask pattern so as to cure only portions of the coating film that have been irradiated with the light, and developing with a developer liquid so as to form a patterned film composed of pixels of respective colors (three colors or four colors). A pattern exposure can alternatively be conducted by scan exposure instead of using a mask pattern.

A UV radiation, such as g line, h line, i line or j line, is preferable as a radiation used to cure the coating film in the exposure process. When producing a color filter for a liquid crystal display apparatus, it is preferable to conduct light exposure with mainly h line or i line using a proximity exposure device or a mirror projection exposure device. When producing a color filter for a solid-state imaging device, it is preferable to use mainly i line in a stepper exposure device since high precision pattern formation is required.

Development Process

The development process is a process of dissolving uncured portions of the curable color composition layer after light exposure into a developer solution, thereby leaving only cured portions to form a patterned color region.

The development temperature is usually from 20° C. to 30° C., and the development time is usually from 20 seconds to 90 seconds.

The developer liquid may be any developer liquid as long as the developer liquid dissolves a coating film of the photocurable curable color composition in uncured portions but does not dissolve cured portions. Specifically, various combinations of organic solvents, and alkaline aqueous solutions are usable.

Examples of the organic solvents include the above-described solvents that can be used in the preparation of the pigment dispersion composition or curable color composition of the invention.

Examples of the alkaline aqueous solutions include an alkaline aqueous solution in which an alkaline compound is dissolved at a concentration of from 0.001 to 10% by mass, preferably from 0.01 to 1% by mass, and examples of the alkaline compound include sodium hydroxide, potassium hydroxide, sodium carbonate, sodium hydrogen carbonate, sodium silicate, sodium metasilicate, ammonia water, ethylamine, diethylamine, dimethylethanolamine, tetramethylammonium hydroxide, tetraethylammonium hydroxide, choline, pyrrole, piperidine and 1,8-diazabicyclo-[5,4,0]-7-undecene. A water-soluble organic solvent such as methanol or ethanol, a surfactant or the like may be added in an appropriate amount into the alkaline aqueous solution.

The development method may be any method such as a dip method, a shower method or a spray method, and a swing method, a spin method, an ultrasonic method or the like may be combined therewith. The face to be developed may be moistened with water or the like in advance of contact with a developer liquid, so as to prevent development unevenness. The development may be conducted while the substrate is inclined.

Puddle development may be employed when producing a color filter for a solid-state imaging device.

After the development treatment, a rinse process whereby excess developer liquid is removed by washing is conducted, and drying is performed, and, thereafter, a heating treatment (postbaking) is conducted so as to perfect the curing.

The rinse treatment is conducted usually with pure water. However, it is all right to use pure water at final washing but use used pure water at initial stages of washing. It is also all right to perform washing while the substrate is inclined. Ultrasonic wave irradiation may be employed additionally.

After rinsing, draining and drying are performed. Thereafter, a heating treatment at, usually, from about 200° C. to about 250° C. is performed. The heating treatment (postbaking) may be conducted on the coating film after development, in a continuous manner or batch manner using a heating means such as a hot plate, a convection oven (hot air circulation dryer) or a high-frequency heating apparatus such that the above conditions are satisfied.

A color filter formed by color cured films of plural colors can be produced by sequentially repeating the above operations for each color in accordance with the desired number of hues.

Although the above descriptions center on mainly color filter applications as applications of the pigment dispersion composition and curable color composition of the invention, the pigment dispersion composition and curable color composition of the invention may be applied to formation of a black matrix that isolates the respective color pixels forming a color filter from each other.

The black matrix is formed by light-exposing and developing a pigment dispersion composition of the invention that contains a black pigment, such as carbon black or titanium black, as a pigment, and thereafter optionally further performing postbaking so as to promote curing of the film, if necessary.

The curable color composition of the invention is excellent in dispersion stability of the pigment, cures with high sensitivity and is also excellent in developability Therefore, a colored region that is in the form of a thin film and that has excellent color characteristics can be formed at high resolution even when the pigment is contained at high concentrations. Accordingly, the curable color composition of the invention is useful for formation of a color region of a color filter, and has wide range of applications.

EXAMPLES

The invention is described more specifically below by way of examples. However, the invention is not limited to the following examples as long as the gist of the invention is retained.

Unless otherwise indicated, "%" and "part(s)" are based on mass.

Example 1

1. Preparation of Pigment Dispersion Composition 200 parts of a phthalocyanine blue pigment C.I. Pigment Blue 15:6, 1,600 parts of sodium chloride and 360 parts of diethyleneglycol were added into a stainless-steel 1-gallon kneader (manufactured by Inoue Manufacturing Co., Ltd.), and the mixture was kneaded at 50° C. for 8 hours. Subsequently, the kneaded material was poured into 10 L of warm water, and agitated for 2 hours while heating at 80° C., thereby formed into a slurry state. Then, the sodium chloride and the diethyleneglycol were removed by repeating filtration and washing with water, and thereafter the resultant was dried at 60° C. for a whole day, as a result of which 190 parts of a blue pigment were obtained.

Subsequently, 200 parts of a dioxazine purple pigment C.I. Pigment Violet 23, 2,000 parts of sodium chloride and 360 parts of diethyleneglycol were added into a stainless-steel 1-gallon kneader (manufactured by Inoue Manufacturing Co, Ltd.), and the mixture was kneaded at 50° C. for 8 hours. Subsequently, the kneaded material was poured into 10 L of warm water, and agitated for 2 hours while heating at 80° C., thereby formed into a slurry state. Then, the sodium chloride and the diethyleneglycol were removed by repeating filtration and washing with water, and thereafter the resultant was dried at 60° C. for a whole day, as a result of which 190 parts of a purple pigment were obtained.

The following composition (1) was mixed by being agitated for 3 hours by a homogenizer at a rotation number of 3,000 r.p.m., as a result of which a mixed solution was prepared.

Composition (1)

| | |
|---|---|
| Pigment Blue 15:6 (average primary particle diameter: 25 nm) ((A) component): | 90 parts |
| Pigment Violet 23 (average primary particle diameter: 25 nm) ((A) component): | 10 parts |
| Pigment derivative (a) ((B) component having the structure shown below): | 10 parts |
| Solution (solids content: 40%) of benzyl methacrylate/ methyl methacrylate (molar ratio: 70/30) copolymer (weight average molecular weight: 10,000) in propylene glycol monomethyl ether acetate: | 50 parts |
| Dispersant (tradename: BYK-161, manufactured by BYK Japan KK, solids content: 30%): | 50 parts |
| Specific polymer dispersant A (solids content: 30%) ((C) component having the structure shown below) | 100 parts |
| Propylene glycol monomethyl ether acetate: | 755 parts |

The following (a) to (d) each represent a mixture in which the average value of n is 1.

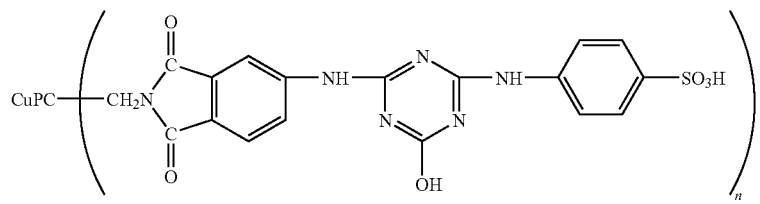

Specific Pigment Derivative (a)

Specifics of Specific Polymer Dispersant A

Copolymer of macromonomer a-11/AA-6 (tradename, manufactured by Toagosei Co., Ltd.)/methacrylic acid (in a weight ratio of 10/75/15) (weight average molecular weight: 20,000)

The monomer a-11 used here is the exemplary monomer (a-11) shown above.

Subsequently, the mixed solution thus obtained was subjected to a co-dispersion treatment for 6 hours using a bead disperser (tradename: ULTRA APEX MILL manufactured by Kotobuki Industries Co., Ltd.) in which zirconia beads having a diameter of 0.1 mm were used. As a result, a pigment dispersion composition was obtained.

The components of the following composition (2) were added to the obtained pigment dispersion composition, followed by mixing by agitation. As a result, a curable color composition (color resist liquid) of the invention was prepared.

Composition (2)

| | |
|---|---|
| Dipentaerythritol penta/hexa acrylate ((D) component): | 200 parts |
| 4-[o-bromo-p-N,N-di(ethoxycarbonyl)aminophenyl]-2,6-di(trichloromethyl)-S-triazine ((E) photopolymerization initiator): | 20 parts |
| Solution (solids content: 40%) of benzyl methacrylate/ methacrylic acid (in a molar ratio of 70/30) copolymer (weight average molecular weight: 30,000, (F) component) in propylene glycol monomethyl ether acetate: | 600 parts |
| Propylene glycol monomethyl ether acetate: | 880 parts |

Examples 2 to 6 and Comparative Examples 1 to 4

Curable color compositions (color resist liquids) of Examples 2 to 6 and Comparative Examples 1 to 4 were prepared in the same manner as in Example 1, except that the (A) organic pigment, (B) specific pigment derivative and (C) specific polymer dispersant used in the preparation of the pigment dispersion composition in Example 1 were respectively changed as shown in Table 1 below.

TABLE 1

| | (A) Organic Pigment | | (B) Specific Pigment | (C) Specific Polymer |
|---|---|---|---|---|
| | Pigment (1) | Pigment (2) | Derivative | Dispersant |
| Example 1 | PB 15:6 | PV 23 | (a) | A |
| Example 2 | PR 254 | PR 177 | (b) | B |
| Example 3 | PR 254 | PR 177 | (c) | B |
| Example 4 | PR 254 | PR 177 | (d) | B |
| Example 5 | PR 254 | PR 177 | (b) | C |
| Example 6 | PR 254 | PR 177 | (b) | D |

TABLE 1-continued

| | (A) Organic Pigment | | (B) Specific Pigment | (C) Specific Polymer |
|---|---|---|---|---|
| | Pigment (1) | Pigment (2) | Derivative | Dispersant |
| Comparative Example 1 | PB 15:6 | PV 23 | (a) | — |
| Comparative Example 2 | PB 15:6 | PV 23 | — | A |
| Comparative Example 3 | PR 254 | PR 177 | (b) | — |
| Comparative Example 4 | PR 254 | PR 177 | — | B |

The specifics of the (B) specific pigment derivatives and the (C) specific polymer dispersants used in Table 1 above are as shown below.

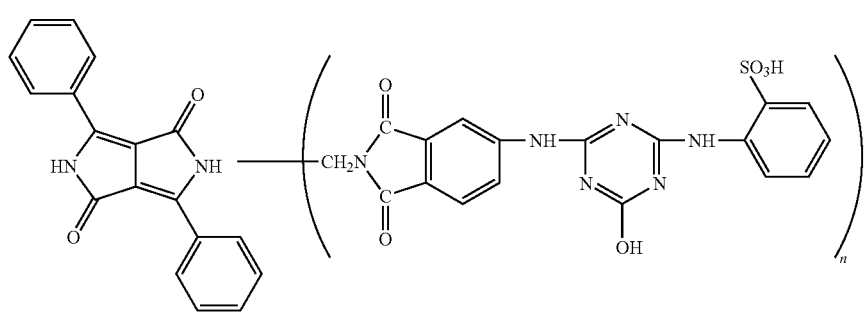

Specific Pigment Derivative (b)

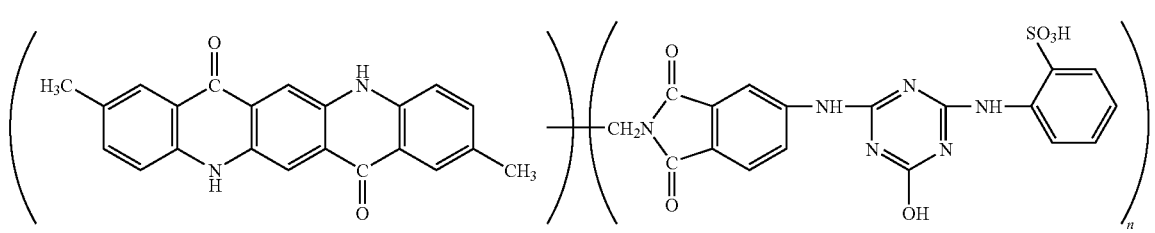

Specific Pigment Derivative (c)

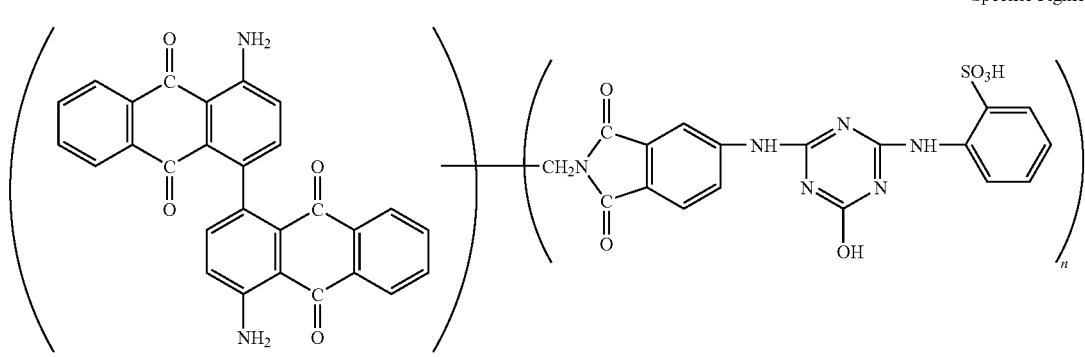

Specific Pigment Derivative (d)

Specific Polymer Dispersant B

Copolymer of macromonomer a-21/AA-6 (tradename, manufactured by Toagosei Co., Ltd.)/methacrylic acid (in a weight ratio of 10/75/15) (weight average molecular weight: 20,000)

Specific Polymer Dispersant C

Copolymer of macromonomer a-10/AA-6 (tradename, manufactured by Toagosei Co., Ltd.)/methacrylic acid (in a weight ratio of 10/75/15) (weight average molecular weight: 20,000)

Specific Polymer Dispersant D

Copolymer of macromonomer a-9/AA-6 (tradename, manufactured by Toagosei Co., Ltd.)/methacrylic acid (in a weight ratio of 10/75/15) (weight average molecular weight: 20,000)

Evaluation of Pigment Dispersion Composition and Curable Color Composition

1. Measurement of Viscosity

The viscosity η1 (at 25° C.) immediately after preparation and the viscosity η2 (at 25° C.) one week after preparation were measured for each of the pigment dispersion composition and the curable color composition (color resist liquids) prepared in each of the Examples and the Comparative Examples, using an EL-type viscometer (manufactured by TOKIMEC Inc). The measurement results are shown in Table 2.

2. Production of Color Filter Substrate

Example 1, Comparative Example 1 and Comparative Example 2

The curable color compositions (color resist liquids) prepared in Example 1, Comparative Example 1 and Comparative Example 2 were respectively applied to separate 100 mm×100 mm glass substrates (tradename: 1737, manufactured by Corning Inc.), such that y value, which is an indicator of color density, became 0.090. Then, drying in an oven at 90° C. was performed for 60 seconds (prebaking)

Then, the entire surface of each coating film was exposed to light at 200 mJ/cm² (illuminance: 20 mW/cm²), and the coating film after exposure was covered with a 1% aqueous solution of an alkaline developer liquid CDK-1 (tradename, manufactured by FUJIFILM Electronics Materials Co., Ltd.), and left to stand for 60 seconds. After the standing, pure water was showered thereon, thereby washing the developer liquid away. Thereafter, the coating film, which had been thus subjected to the photocuring treatment and the development treatment, was subjected to a heating treatment (postbaking) for 1 hour in an oven at 220° C., as a result of which a color resin coating film (color region) for forming a color filter was formed on the glass substrate, and a color filter substrate (color filter) for evaluation that had a single-color color region was produced.

Examples 2 to 6, Comparative Example 3 and Comparative Example 4

The curable color compositions (color resist liquids) prepared in Examples 2 to 6, Comparative Example 3 and Comparative Example 4 were respectively applied to separate 100 mm×100 mm glass substrates (tradename: 1737, manufactured by Corning Inc.), such that x value, which is an indicator of color density, became 0.650. Then, drying in an oven at 90° C. was performed for 60 seconds (prebaking).

Then, the entire surface of each coating film was exposed to light at 200 mJ/cm$^2$ (illuminance: 20 mW/cm$^2$), and the coating film after exposure was covered with a 1% aqueous solution of an alkaline developer liquid CDK-1 (tradename, manufactured by FUJIFILM Electronics Materials Co., Ltd.), and left to stand for 60 seconds. After the standing, pure water was showered thereon, thereby washing the developer liquid away. Thereafter, the coating film, which had been thus subjected to the photocuring treatment and the development treatment, was subjected to a heating treatment (postbaking) for 1 hour in an oven at 220° C., as a result of which a color resin coating film (color region) for forming a color filter was formed on the glass substrate, and a color filter substrate (color filter) for evaluation that had a single-color color region was produced.

3. Measurement and Evaluation of Contrast

The contrast of each of the color filter substrates produced was measured as described below. The results are shown in Table 2 below.

Method of Measuring Contrast

A polarizer was placed on the color resin coating film of each color filter substrate, such that the color resin coating film was disposed between the polarizer and another polarizer. The illuminance when the polarizers are parallel to each other and the illuminance when the polarizers are orthogonal to each other were measured with a BM-5 (tradename, manufactured by TOPCON CORPORATION). The value obtained by dividing the illuminance when the polarizers are parallel to each other by the illuminance when the polarizers are orthogonal to each other (the illuminance when the polarizers are parallel to each other/the illuminance when the polarizers are orthogonal to each other) was used as an indicator for evaluating contrast. If this value is larger, the color filter substrate is assessed as having more favorable contrast. The results are shown in Table 2.

4. Measurement of Solvent Solubility and Coating Defects

Solvent Solubility

Each of the curable color compositions (color resist liquids) prepared in Examples and Comparative Examples was coated on a 550 mm×650 mm glass substrate (tradename: 1737, manufactured by Corning Inc.) using a slit coater (head coater equipped with a head manufactured by Faster Inc.) at a coating speed of 200 mm/sec. Thereafter, drying in an oven at 90° C. was performed for 60 seconds (prebaking) The film thickness of the dried film was 2 μm.

The substrate having the dried film was fixed at an inclination of 45 degrees, and liquid droplets (0.1 ml) of propylene glycol monomethyl ether acetate were dropped thereon at an interval of 1 second, and dissolution of the film surface was observed with the naked eyes. A higher tendency for the film to dissolve is assessed as indicating that the curable composition coating liquid, if remaining in the neighborhood of a nozzle, can be easily removed by dissolution and thus indicating excellent suitability for slit coating. The results are shown in Table 2.

The evaluation criteria are as follows.
A: The film is dissolved by from 1 to 3 droplets
B: The film is dissolved by from 4 to 6 droplets
C: The film is dissolved by from 7 to 10 droplets
D: The film is not dissolved even by 10 droplets Coating Defects Coating by a slit coater was performed using each of the curable color compositions (color resist liquids) prepared in the Examples and Comparative Examples, under the same conditions as the film for measuring solubility. The coating was performed on 150 sheets (at a coating interval of 30 seconds between each sheet; dummy ejection: 2 seconds), and the coating surface state of the 150th sheet was observed with the naked eyes. The results are shown in Table 2.

The evaluation criteria are as follows, and rank C is the lower limit of the practically tolerable range.

A: The number of defects is less than 0.5 per 0.25 meter square
B: The number of defects is less than 1 per 0.25 meter square
C: The number of defects is from 1 to less than 2 per 0.25 meter square
D: The number of defects is 2 or more per 0.25 meter square

TABLE 2

| | Curable Color Composition | | | | | | |
|---|---|---|---|---|---|---|---|
| | Pigment Dispersion Composition | | | | | Solvent | Coating |
| | η1 | η2 | η1 | η2 | Contrast | Solubility | Defects |
| Example 1 | 10 | 11 | 5 | 5 | 2000 | A | A |
| Example 2 | 8 | 8 | 4 | 4 | 3200 | A | A |
| Example 3 | 9 | 10 | 4 | 5 | 2700 | B | B |
| Example 4 | 10 | 10 | 5 | 5 | 3100 | B | B |
| Example 5 | 11 | 12 | 5 | 6 | 3000 | B | B |
| Example 6 | 10 | 11 | 5 | 5 | 3100 | B | B |
| Comparative Example 1 | 50 | 110 | 11 | 20 | 1400 | C | C |
| Comparative Example 2 | 200 | Measurement was impossible | 20 | 120 | 800 | D | D |
| Comparative Example 3 | 30 | 90 | 10 | 18 | 1700 | C | C |
| Comparative Example 4 | 150 | Measurement was impossible | 16 | 100 | 1100 | D | D |

As is apparent from Table 2, the pigment dispersion composition and curable color composition of the invention are excellent in the dispersion stability of the organic pigment contained therein.

The curable color compositions of Examples 1 to 6 did not exhibit coating defects at the time of slit coating and exhibited excellent solvent solubility, which indicates excellent suitability for slit coating. It is also understood that the curable color compositions of Examples 1 to 6 were excellent in dispersibility and dispersion stability of the pigment, and were capable of forming color regions having excellent contrast. In contrast, the contrast and the suitability for slit coating of color films formed in Comparative Examples were inferior to those in Examples. In particular, in Comparative Examples 1 and 3, in which the (B) specific pigment derivative according to the invention was not used, the dispersion stability of the pigment was remarkably low and at a practically problematic level.

The invention claimed is:

1. A pigment dispersion composition comprising (A) an organic pigment, (B) a pigment derivative represented by Formula (I), and (C) a polymer compound having a pigment-adsorptive functional group:

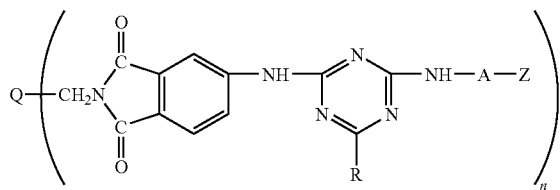

Formula (I)

wherein, in Formula (I), Q represents an organic colorant residue having an aromatic ring; A represents an ethylene group, a phenylene group or a naphthylene group; R represents a hydroxyl group or a group represented by —NH-A-Z; Z represents a substituent selected from —SO$_3$H, —COOH or a metal salt, ammonium salt or amine salt thereof; n represents an integer of from 1 to 4; when R represents —NH-A-Z, in the two —NH—A—Zs bonded to the triazine ring contained in each of the n partial structures (the structure in parentheses) bonded to Q in Formula (I), the groups represented by the two As may be the same as each other or different from each other, and the substituents represented by the two Zs may be the same as each other or different from each other.

2. The pigment dispersion composition according to claim 1, wherein Q in Formula (I) is an organic colorant residue selected from the group consisting of phthalocyanine colorant residues, quinacridone colorant residues, diketopyrrolopyrrole colorant residues, anthraquinone colorant residues and azo colorant residues.

3. A curable color composition comprising the pigment dispersion composition of claim 1, (D) a polymerizable compound and (E) a photopolymerization initiator.

4. The curable color composition according to claim 3, wherein Q in Formula (I) is an organic colorant residue selected from the group consisting of phthalocyanine colorant residues, quinacridone colorant residues, diketopyrrolopyrrole colorant residues, anthraquinone colorant residues and azo colorant residues.

5. The curable color composition according to claim 3, further comprising (F) an alkali-soluble resin.

6. The curable color composition according to claim 4, further comprising (F) an alkali-soluble resin.

7. A color filter comprising, on a substrate, a color region formed from the curable color composition of claim 3.

8. A method for producing a color filter, the method comprising:
 a process of slit-coating the curable color composition of claim 3 directly on a substrate, or on a substrate with at least one other layer disposed therebetween, so as to form a curable color composition coating layer;
 an exposure process of pattern-exposing the formed coating layer to light; and
 a development process of developing the curable color composition coating layer after the exposure to light with an alkaline developer to form a patterned color region.

* * * * *